(12) United States Patent
AbuEideh

(10) Patent No.: US 11,424,626 B2
(45) Date of Patent: Aug. 23, 2022

(54) METHODS, SYSTEMS, AND APPARATUS FOR FACILITATING CHARGING OF PORTABLE POWER SOURCES USING A CHARGING SYSTEM

(71) Applicant: Ghaith AbuEideh, Richardson, TX (US)

(72) Inventor: Ghaith AbuEideh, Richardson, TX (US)

( * ) Notice: Subject to any disclaimer, the term of this patent is extended or adjusted under 35 U.S.C. 154(b) by 341 days.

(21) Appl. No.: 16/818,733

(22) Filed: Mar. 13, 2020

(65) Prior Publication Data
US 2020/0212691 A1  Jul. 2, 2020

Related U.S. Application Data

(63) Continuation-in-part of application No. 15/925,486, filed on Mar. 19, 2018, now Pat. No. 10,615,631, which is a continuation-in-part of application No. 15/422,457, filed on Feb. 1, 2017, now Pat. No. 9,954,381.

(60) Provisional application No. 62/289,455, filed on Feb. 1, 2016.

(51) Int. Cl.
*H02J 7/00* (2006.01)
(52) U.S. Cl.
CPC ........ *H02J 7/00036* (2020.01); *H02J 7/0071* (2020.01); *H02J 7/00712* (2020.01)

(58) Field of Classification Search
CPC ... H02J 7/00036; H02J 7/00712; H02J 7/0071
See application file for complete search history.

(56) References Cited

U.S. PATENT DOCUMENTS

| | | | |
|---|---|---|---|
| 2009/0289603 A1* | 11/2009 | Mahowald | H02J 7/007182 320/160 |
| 2015/0188346 A1* | 7/2015 | Oku | H02J 7/007 320/138 |
| 2016/0164322 A1* | 6/2016 | Li | H02J 7/00 320/137 |
| 2021/0376644 A1* | 12/2021 | Yang | H02J 7/00034 |

* cited by examiner

*Primary Examiner* — Fayyaz Alam

(57) ABSTRACT

Disclosed herein is a method of facilitating charging of portable power sources using a charging system, in accordance with some embodiments. Accordingly, the method may include a step of receiving, using a communication interface, a power source information corresponding to a power source attribute from a user device, a step of analyzing, using a processing device, the power source information, a step of identifying, using the processing device, a portable power source of the portable power sources based the analyzing, a step of retrieving, using a memory device, a standard power source information corresponding to the power source attribute of the portable power source based on the identifying, a step of comparing, using the processing device, the power source information and the standard power source information, and a step of generating, using the processing device, a charging command based on the comparing.

29 Claims, 24 Drawing Sheets

METHODS, SYSTEMS, AND APPARATUS FOR FACILITATING CHARGING OF PORTABLE POWER SOURCES USING A CHARGING SYSTEM

The current application claims a priority to the U.S. Provisional Patent application Ser. No. 62/289,455 filed on Feb. 1, 2016, and the U.S. Non-Provisional patent application Ser. No. 15/422,457 filed on Feb. 1, 2017, and the U.S. Non-Provisional patent application Ser. No. 15/925,486 filed on Mar. 19, 2018.

FIELD OF THE INVENTION

Generally, the present disclosure relates to smart charging system. More specifically, the present disclosure relates to methods, systems, apparatuses and devices for facilitating charging of portable power sources using a charging system.

BACKGROUND OF THE INVENTION

It is estimated that the average smartphone wastes 6.5 kilowatt-hour (kWh) a year by being plugged in overnight. While this number represents a fraction of the average American home's annual electrical usage, the number becomes significant when applied to multiple rechargeable electronic devices being charged in multiple homes. With over 117 million homes in the U.S. alone, this seemingly insignificant figure becomes staggeringly large; rivaling the power consumption of small countries. Once this number is applied to the global usage of rechargeable electronic devices, it becomes even more evident that the way we charge smartphones needs to be changed. In addition to wasting a vast amount of energy, the practice of leaving smartphones plugged in overnight damages the smartphones battery. When a smartphone remains connected to an external power supply after its battery is fully charged, the performance of the battery declines. Chronically overcharging a battery reduces the battery's lifespan.

The present disclosure, the integrated power-regulating charge system, addresses these problems by implementing a smart charging system that turns off the flow of power to a connected smartphone. The present disclosure accomplishes this by actively monitoring the charge stored within an electronic device's battery. Once the charge reaches a predetermined threshold, the present disclosure turns off the current flow. To ensure the user has a fully charged device when the user unplugs the phone, the present disclosure restarts the current flow to the smartphone battery once the charge falls below a predefined threshold. In this way, the present disclosure saves energy and extends the runtime and life of rechargeable batteries.

Therefore, there is a need for improved methods, systems, apparatuses and devices for facilitating charging of portable power sources using a charging system that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating charging of portable power sources using a charging system, in accordance with some embodiments. Accordingly, the method may include a step of receiving, using a communication interface, at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge. Further, the method may include a step of analyzing, using a processing device, the at least one power source information. Further, the method may include a step of identifying, using the processing device, a portable power source of the plurality of portable power sources based the analyzing. Further, the method may include a step of retrieving, using a memory device, at least one standard power source information corresponding to the at least one power source attribute of the portable power source based on the identifying. Further, a standard power source information of the at least one standard source information may include an optimal charge level corresponding to the power source charge. Further, the method may include a step of comparing, using the processing device, the at least one power source information and the at least one standard power source information. Further, the method may include a step of generating, using the processing device, a charging command based on the comparing. Further, the charging command incorporation with a shutoff switch of the charging system may be configured for charging the portable power source.

Further disclosed herein is a charging system for facilitating charging of portable power sources, in accordance with some embodiments. Accordingly, the charging system may include a communication interface configured for receiving at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge. Further, the charging system may include a processing device communicatively coupled with the communication interface. Further, the processing device may be configured for analyzing the at least one power source information. Further, the processing device may be configured for identifying a portable power source of the plurality of portable power sources based the analyzing. Further, the processing device may be configured for comparing the at least one power source information and at least one standard power source information corresponding to the at least one power source attribute of the portable power source. Further, a standard power source information of the at least one standard source information may include an optimal charge level corresponding to the power source charge. Further, the processing device may be configured for generating a charging command based on the comparing. Further, the charging command incorporation with a shutoff switch of the charging system may be configured for charging the portable power source. Further, the charging system may include a memory device communicatively coupled with the processing device. Further, the memory device may be configured for retrieving the at least one standard power source information based on the identifying.

Further disclosed herein is a charging system for facilitating charging of portable power sources, in accordance with some embodiments. Accordingly, the charging system may include an electrical input terminal, an output terminal, a shutoff switch, a microcontroller, a wireless communication module, a rectifier, a voltage regulator, a semiconductor substrate, an external power supply, a portable power source, and a memory device. Further, the rectifier, the voltage regulator and the shutoff switch being electrically integrated between the electrical input terminal and the output terminal. the electrical input terminal being electrically connected to the portable power source sequentially through the rectifier, the voltage regulator, the shutoff switch and the output terminal. Further, the microcontroller being electronically connected to the shutoff switch. Further, the wireless communication module is electronically connected to the microcontroller. Further, the electrical input terminal being externally mounted onto the semiconductor substrate. Further, the output terminal being externally mounted onto the semiconductor substrate. Further, the output terminal being positioned offset from the electrical input terminal across the semiconductor substrate. Further, the electrical input terminal, the rectifier, the voltage regulator, the shutoff switch, the output terminal, the microcontroller and the wireless communication module being operatively coupled to the semiconductor substrate via electrical connections between the electrical input terminal, the rectifier, the voltage regulator, the shutoff switch, the output terminal, the microcontroller and the wireless communication module established by the semiconductor substrate. Further, the output terminal being operatively coupled to the portable power source. Further, the electrical input terminal being operatively coupled to the external power supply. Further, the wireless communication module may be configured for receiving at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge. Further, the memory device configured for storing the at least one power source information. Further, the memory device is configured for at least one standard power source information corresponding to the at least one power source attribute associated with a plurality portable power sources comprised in the user device. Further, the microcontroller may be configured for analyzing the at least one power source information. Further, the microcontroller may be configured identifying a portable power source of the plurality of power sources based on the analyzing. Further, the microcontroller may be configured retrieving the at least one standard power source information corresponding to the at least one power source attribute associated with the power source based on the identifying. Further, a standard power source information of the at least one standard source information may include an optimal charge level corresponding to the power source charge. Further, the microcontroller may be configured comparing the at least one power source information and the at least one standard power source information. Further, the microcontroller may be configured controlling the shutoff switch based on the comparing. Further, the shutoff switch facilitates the charging of the portable power source.

Further disclosed herein is a portable user device for facilitating charging of a power source of the portable user device, in accordance with some embodiments. Accordingly, the portable user device may include a memory device, a processing device, and a shutoff switch. Further, the memory device may be configured for retrieving at least one power source information corresponding to at least one power source attribute associated with the power source. Further, a power source attribute of the at least one power source attribute may include a power source charge. Further, a power source information of the at least one power source information may include a current charge level corresponding to the power source charge. Further, the memory device may be configured for retrieving at least one standard power source information based on the identifying. Further, the processing device may be communicatively coupled with the memory device. Further, the processing device may be configured for analyzing the at least one power source information. Further, the processing device may be configured for identifying the power source based the analyzing. Further, the processing device may be configured for comparing the at least one power source information and the at least one standard power source information corresponding to the at least one power source attribute of the power source. Further, a standard power source information of the at least one standard source information may include an optimal charge level corresponding to the power source charge. Further, the processing device may be configured for generating a charging command based on the comparing. Further, the shutoff switch may be communicatively coupled with the processing device. Further, the shutoff switch may be configured to transition between a power-on state and a power-off state based on the control command. Further, the shutoff switch allows the charging of the power source by an external power supply in the power-on state and the shutoff switch does not allow the charging of the power source by the external power supply in the power-off state.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
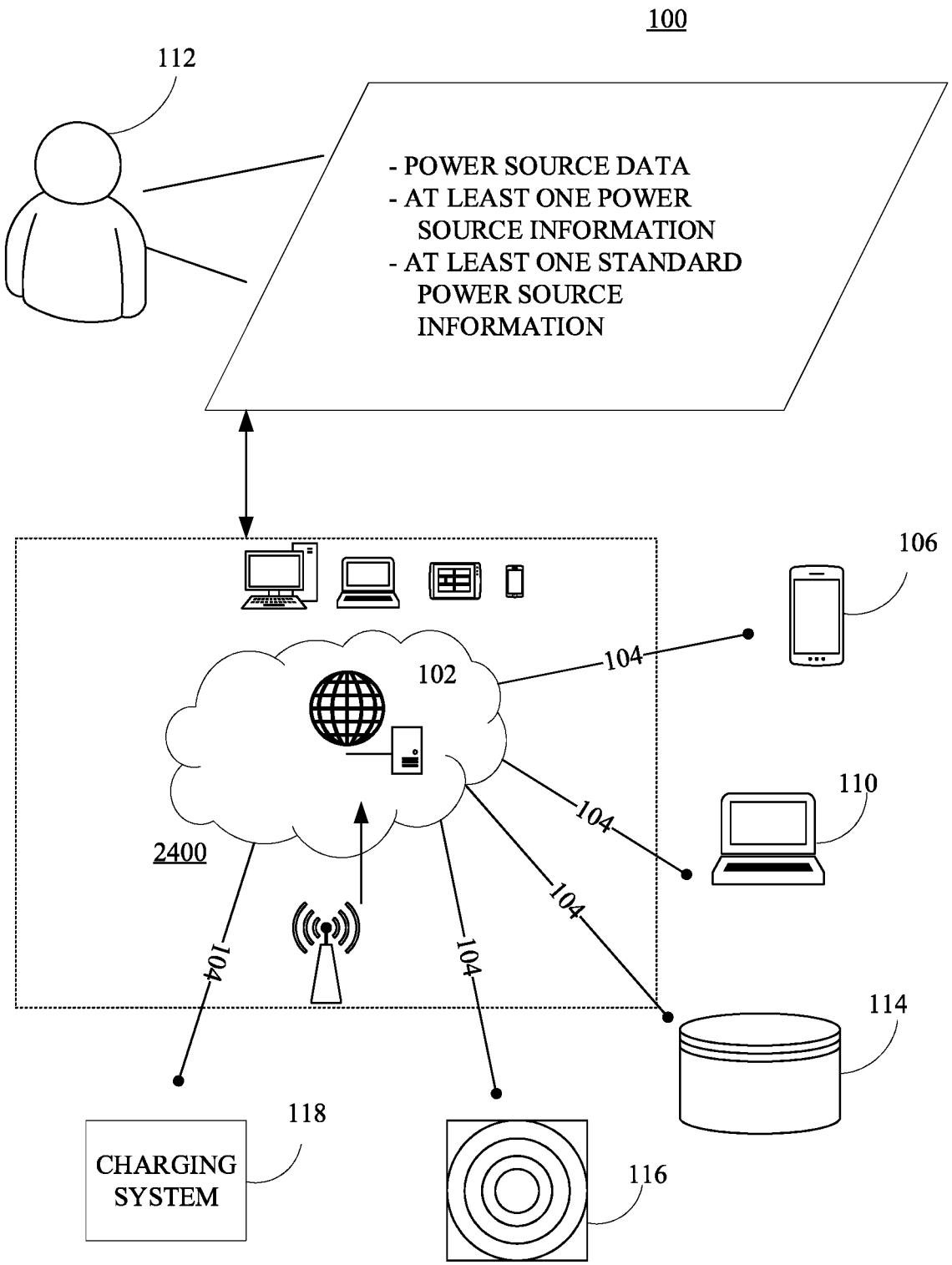
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses and devices for facilitating charging of portable power sources using a charging system, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses and devices for facilitating charging of portable power sources using a charging system. Further, a method for facilitating charging of the portable power sources is implemented using a power regulating charging software. Further, a Microcontroller ("MC") located at the apparatus for facilitating the charging of the portable power source may include a CPU, RAM & ROM programmed with proprietary machine-learning software. And a set of stored data for each smartphone device running on IOS or Android from GenS till date. Moreover, there is an initial charging range that is called the Pre-Set Condition ("Default") charging range which is from 80% to 100% charge range.

Items Stored in MC Memory

List of Li-Ion batteries for all smartphones with related Li-Ion batteries optimal conditions. For example, for Samsung Note 8 battery capacity is 3,300 milliamps, optimal running temp is 28 C.

The timer/Charging cycle counter counts the charging cycles of the charging system. For example, the charging system whenever partially charges the battery (portable power source) say from 80%-100% then the 20% charge is considered one-fifth of a charging cycle and so on. This counter adds each charge from start charging to stop charging and keeps comparing with the manufacturer's optimal charging cycles for the battery. For the same above example, the optimal battery life for Samsung Note 8 as per the manufacturer is 900 charging cycles.

Cellphone application ("App") extracts info (Temp, battery type, voltage level, charge state) from cellphone CPU, sends info to MC, MC detects, analyzes and compares the info to device default settings and decides if to start charging or to stop charging.

The default charging range (80%-100%) is the starting point that the system initiates the charging at. However, due to the machine learning algorithm logic this charging range might change with time and the number of trials/charging that the user charges the cellphone.

Below is the logic for the machine learning algorithm:

The connection is made, a cellphone is connected to the apparatus and the app is running Battery temp, voltage level is detected, compared to battery default settings and charging default settings if battery level is below default presetting level then charging will start, current will flow to the battery (either through the cable or via magnetic field if wireless charging) software will keep monitoring the battery temp, voltage until battery level reaches 100%. Then the decision takes place to stop charging and current will stop flowing to the battery. The charging cycle counter will add this charge to the total charging cycles of the battery count and saves it in memory. A log is taken, and device health is monitored. Until the battery charge level reaches lower charging range, for example, 80% and again battery temp is logged, the battery voltage is logged and current will start flowing again and so on. As part of the machine learning algorithm, this technique is taken as bunches each 20 charging cycles. Then the system compares the battery off charging temp, voltage level with the default battery settings. If the battery health is unchanged then the charging range stays the same. However, if battery health started to change, for example, higher off-charge temperature while the device is ideal then the charging range will start adjusting. At 100 charging trials the system will check again and compares to default and accordingly adjust the charging range.

If there is a software bug, then recovery detects this bug, and address the software to return (loops back) to default settings At any time, the user can always change/override and change the settings manually.

Every batch (each batch contains 100 charging trials) is sent through the app to the cloud engine to detect, analyze, and feedback is sent to the user with the amount of energy saved while using the proprietary technology, and how much extra battery life is expected for cellphone battery.

FIG. 1 is an illustration of an online platform 100 consistent with various embodiments of the present disclosure. By way of non-limiting example, the online platform 100 to facilitate charging of portable power sources using a charging system may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, a charging system 118 (such as a charging system 1700 and a charging system 1800), and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 2400.

In reference to FIG. 2 through FIG. 6, an invention, the integrated power-regulating charge system, is a self-contained module that can be integrated into the power supply circuitry of any electronic device. The invention is designed to be inserted in between the electronic device's charging terminal and battery. Thus positioned, the invention is able to act as an automatic shutoff switch and voltage controller that regulates the amount of electrical power that is supplied to the electronic device. Additionally, the invention protects the electronic device from damage caused by voltage and current surges.

Figure 2:
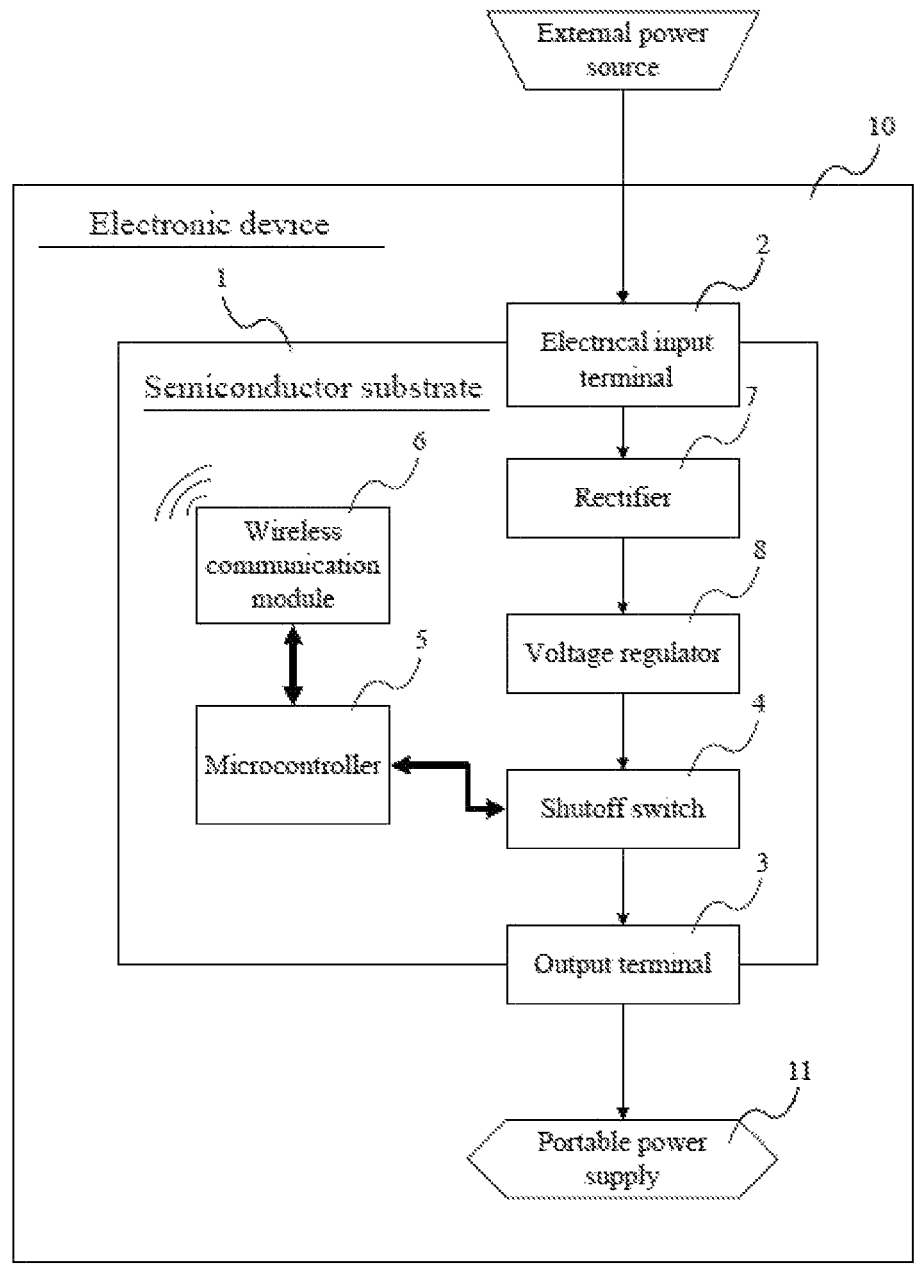
FIG. 2 is a block diagram of an invention being used as a self-contained power-regulation module, wherein thinner flowlines represent electrical connections between components, thicker flowlines represent electronic connections between components and dashed flow lines indicate the components being communicably coupled.

In reference to FIG. 2, the invention is designed to function as an integrated circuit that can be connected to the power delivery circuitry of the electronic device. To achieve this, the invention includes an electrical input terminal and a semiconductor substrate. The electrical input terminal is an electrical connection point that enables the invention to be placed into electrical communication with a power input terminal of the electronic device. Additionally, the electrical input terminal is electrically connected to the output terminal through the shutoff switch. Further, the output terminal is connected to a portable power source of the electronic device. Accordingly, electrical power that is delivered to the power input terminal of the electronic device passes through the electrical input terminal, the shutoff switch, and the output terminal, before being delivered to the portable power supply of the electronic device. Alternatively, the invention may be used as a voltage regulator for an electronic device that does not have a portable power supply. In this embodiment, the invention serves as a failsafe that prevents the electronic device from being damaged by power surges. The semiconductor substrate is a connective framework into which the electrical components of the invention are integrated to form an integrated circuit. Additionally, the electrical input terminal and the output terminal are externally mounted onto the semiconductor substrate. As a result, the invention can be inserted into an electrical circuit and used to govern the flow of electrical power through the electrical circuit.

In reference to FIG. 3 through FIG. 6, the invention is a charger for a mobile computing device. It is an aim of the invention to provide a mobile device charger that receives wireless commands to continue or shut off the flow of electrical power to the battery of a connected mobile computing device. This functionality prevents wasted energy and battery damage by preventing excess electrical power from being supplied to a fully charged battery. To accomplish this, the invention is equipped with a wireless radio that communicates with a remote computing device that is capable of analyzing the level of charge stored within the battery of the mobile computing device connected to the invention. The invention selectively transmits power to the connected mobile computing device when directed by the remote computing device. In the preferred embodiment of the invention, the mobile computing device functions as the remote computing device and wirelessly transmits commands to the charger based on the level of charged stored within the mobile computing device internal battery. In a first alternative embodiment the remote computing device is a remote server that issues commands to the invention.

Figure 3:
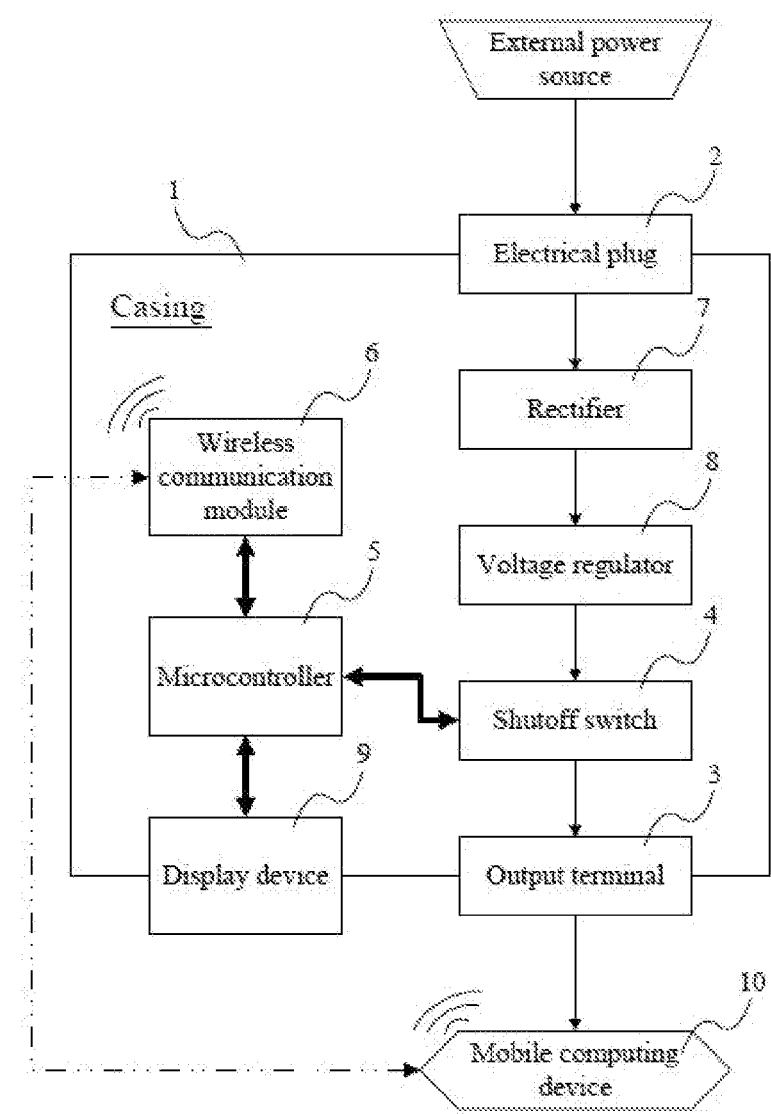
FIG. 3 is a block diagram of an alternative embodiment of the invention, wherein thinner flowlines represent electrical connections between components, thicker flowlines represent electronic connections between components and dashed flow lines indicate the components being communicably coupled.

In reference to FIG. 3, the invention is a power regulating charger that is used to deliver electrical power to a connected mobile computing device. To accomplish this, the invention comprises an electrical plug 2, an output terminal 3, a shutoff switch 4, a microcontroller 5, and a wireless communication module 6. The electrical plug 2 is an electrical terminal that allows the invention to receive electrical power from an external power supply. The output terminal 3 is an electrical terminal that allows the invention to send electrical power to an external electrical load. Preferably, the output terminal 3 delivers electrical power required to charge the battery of the connected mobile computing device. The shutoff switch 4 is a programmable electrical switch capable of opening or closing a circuit in response to a command received from an electronically connected microcontroller 5. The microcontroller 5 is a processing device that interprets commands received from the remote computing device and uses these commands to manage the operation of the electrical components within the invention. The wireless communication module 6 is a wireless radio that connects and communicates with external devices via wireless data transmission protocols. The wireless communication module 6 is capable of using standards including, but not limited to, such as Bluetooth, WI-FI, GSM, CDMA, and ZigBee.

The overall configuration of the aforementioned components allow the invention to selectively transfer electrical power from an external power source to the mobile computing device. The electrical plug 2 is electrically connected to the output terminal 3 through the shutoff switch 4 so that the shutoff switch 4 is able to govern the flow of electrical current from the electrical plug 2 to the output terminal 3. The microcontroller 5 is electronically connected to the shutoff switch 4. Consequently, the microcontroller 5 is able to issue the commands which direct the shutoff switch 4 to open the circuit between the electrical plug 2 and the output terminal 3; thus, preventing electrical current to flow between the electrical plug and the output terminal. Conversely, the microcontroller 5 is able to issue the commands that direct the shutoff switch 4 to close the circuit between the electrical plug 2 and the output terminal 3; thus, enabling electrical current to flow between the two components. Finally, the wireless communication module 6 is electronically connected to the microcontroller 5. As a result, the wireless communication module 6 is able to transmit wirelessly received commands to the microcontroller 5. This connection enables the microcontroller 5 to execute the commands that have been wirelessly issued by the remote computing device.

In reference to FIG. 3, the invention further comprises a casing 1, which provides a structural enclosure for the other components of the invention. The casing 1 is preferably a rigid housing used to maintain the components of the invention in desired positions. As such, the shutoff switch 4, the microcontroller 5, and the wireless communication module 6 are positioned within the casing 1. Thus, the casing 1 protects these electronic components from being inadvertently damaged by objects in the external environment. The casing is a preferably an ergonomic shape so that a user is easily able to insert the electrical plug 2 into any kind of external power supply, such as wall sockets, surge protectors, extension cords, etc. The electrical plug 2 traverses out of the casing 1. Accordingly, the electrical plug 2 is able to connect the casing 1 to the electrical socket of an external power supply. This connection forms a detachable mount that maintains the invention in a fixed position until the electrical plug 2 is detached from the external power supply. Additionally, the detachable connection with the external power supply that is established by the electrical plug 2 maintains the electrical plug 2 in electrical communication with the external power supply.

In a second alternative embodiment of the invention, the output plug 2 is a female electrical receptacle into which the user is able to insert the male connector of a standard wall charger. In this embodiment, the invention functions as an intermediary device that is positioned between the standard wall charger and the mobile computing device. Thus positioned, the invention is able to interrupt the flow of electrical power from the standard wall charger to the connected mobile computing device based on commands issued by the mobile computing device.

The output terminal 3 traverses into the casing 1 so that a mobile computing device is able to electrically connect to the invention. The electrical plug 2 is preferably a male terminal that is inserted into a female socket. Conversely, the output terminal 3 is preferably a receptacle into which a male terminal is inserted. In the invention, the electrical plug 2 is designed to meet the specifications for types A through O of the international standards for electrical outlet plugs. A third alternative embodiment of the invention is designed with an electrical plug 2 that can be connected to the cigarette lighter receptacle of a vehicle.

Figure 4:
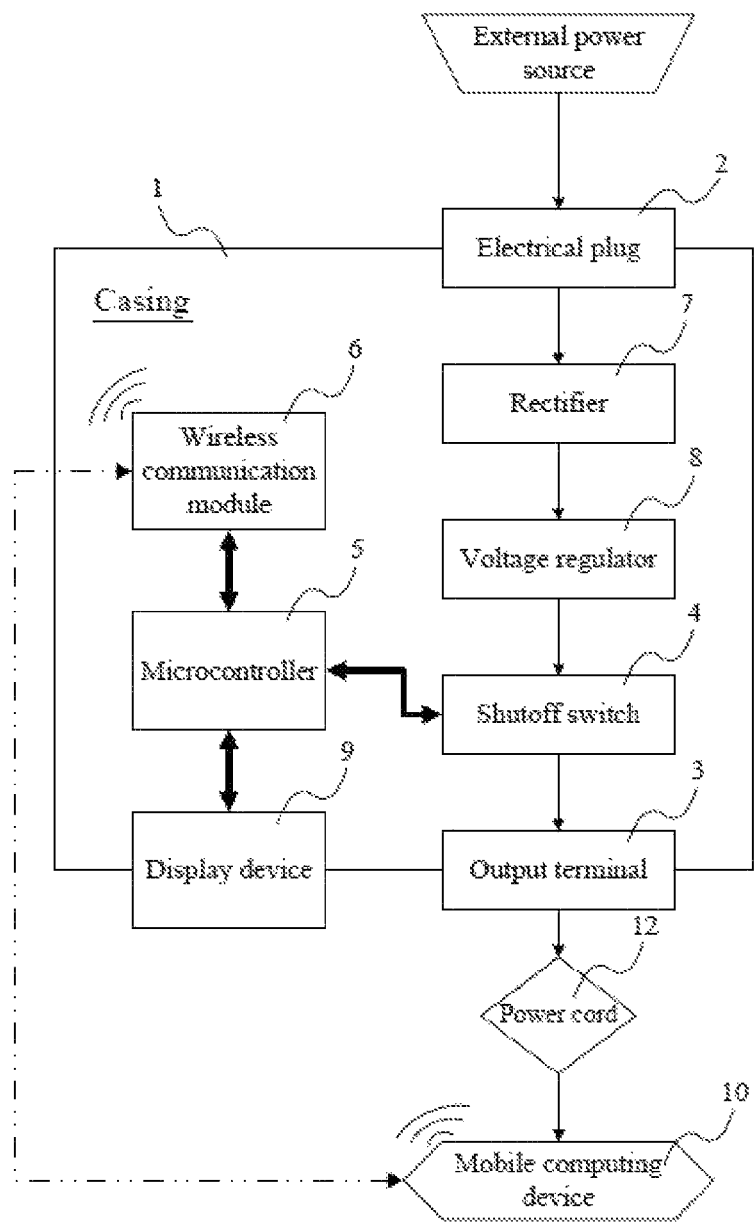
FIG. 4 is a block diagram of an alternative embodiment of the invention with a power cord connecting the output terminal to the mobile computing device, wherein thinner flowlines represent electrical connections between components, thicker flowlines represent electronic connections between components and dashed flow lines indicate the components being communicably coupled.
Figure 5:
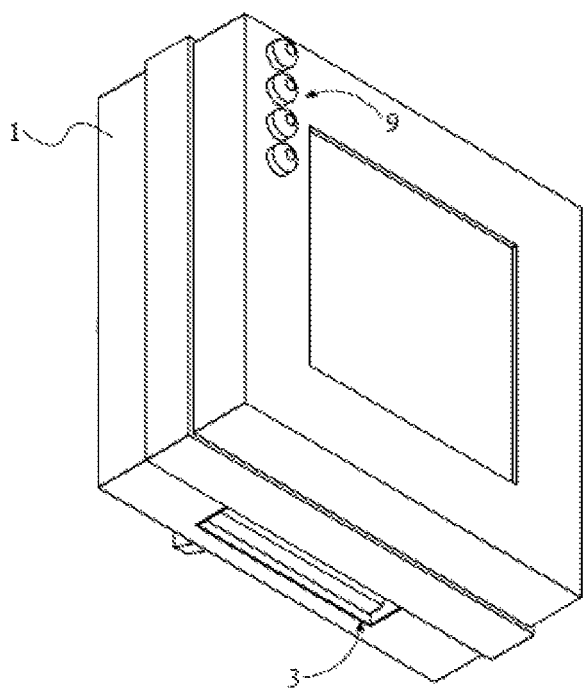
FIG. 5 is a front perspective view of an alternative embodiment of the invention.
Figure 6:
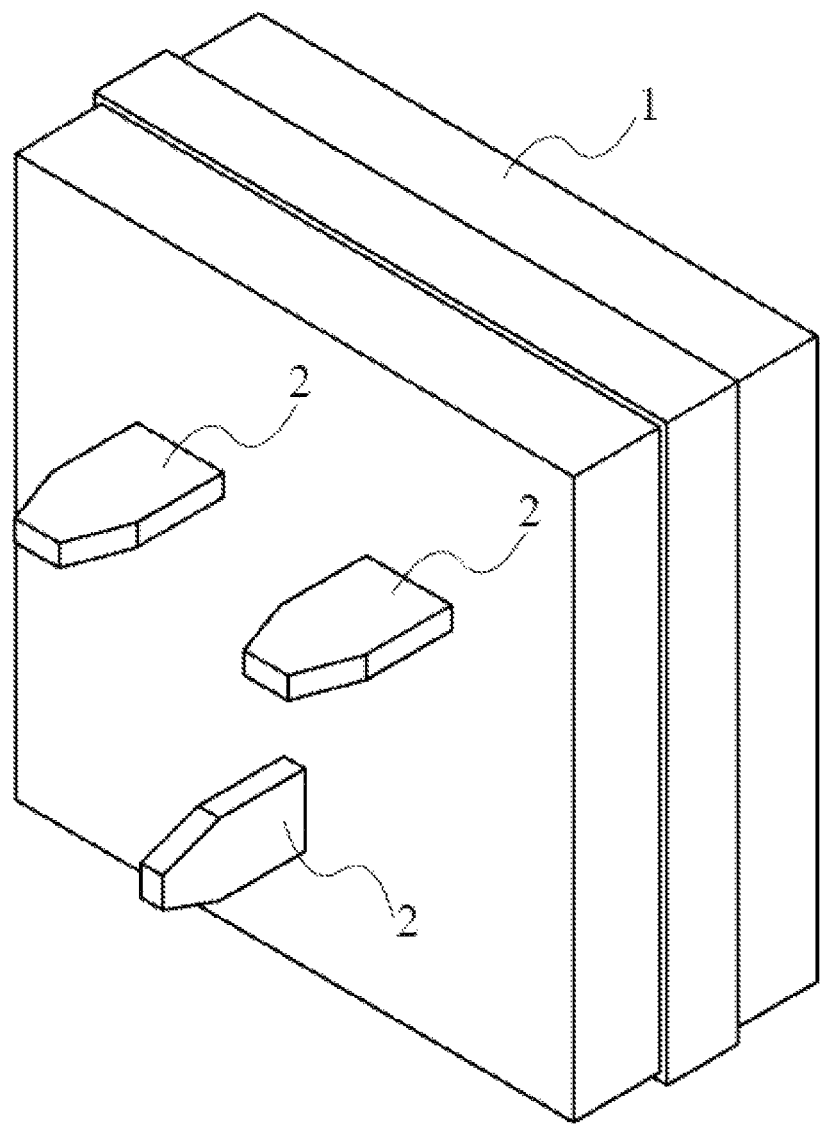
FIG. 6 is a rear perspective view of an alternative embodiment of the invention.

In reference to FIG. 3 and FIG. 4, the invention further comprises a rectifier 7 that is used to convert the alternating current (AC) voltage delivered by the external power supply into direct current (DC) that is used to charge the battery of the connected mobile computing device. Additionally, the invention further comprises a voltage regulator 8 that is an electrical component used to maintain the DC voltage that is generated by the rectifier 7 at a constant level. The rectifier 7 is electrically connected to the voltage regulator 8. Consequently, the voltage regulator 8 is able to use the irregular voltage generated by the rectifier 7 to output a constant voltage. The rectifier 7 and the voltage regulator 8 are electrically integrated in between the electrical plug 2 and the output terminal 3. As a result, the rectifier 7 and the voltage regulator 8 are able to convert the AC voltage that is supplied to the electrical plug 2 into a DC voltage which can be delivered to the battery of the connected mobile computing device. More specifically, the rectifier 7 and the voltage regulator 8 being electrically integrated in between the electrical plug 2 and the shutoff switch 4. Thus integrated, the shutoff switch 4 is able to open to prevent power surges as well as the flow of electrical power into the connected mobile computing device.

In reference to FIG. 3 and FIG. 4, the invention further comprises a display device 9 that is used to generate a visual representation of the electrical state of the battery of the mobile computing device that is connected to the output terminal 3. The display device 9 is electronically connected to the microcontroller 5 so that the microcontroller 5 is able to dictate the type of information which is visually output by the display device 9. Furthermore, the display device 9 is externally mounted to the casing 1. Consequently, the display device 9 is maintained in a position that facilitates visual inspection by the user. That is, the display device 9 is mounted onto the casing 1 in a position that enables the user to easily determine the electrical state of the connected mobile computing device 10. In the preferred embodiment of the invention, the display device 9 is a plurality of light emitting diodes (LED) positioned on the exterior surface of the casing 1. In this embodiment, the display device 9 illuminates one or more LEDs to indicate the charge in a connected device, as well as the state of the current charging operation. In a fourth alternative embodiment of the invention, the display device 9 is a digital display capable of rendering text and graphics to convey pertinent system information.

In reference to FIG. 3 and FIG. 4, a system for implementing the integrated power-regulating charge system described herein further comprises a mobile computing device 10. The use of this system enables the integrated power-regulating charge system to charge the battery of the mobile computing device 10. Additionally, the system enables the mobile computing device 10 to wirelessly transmit commands to the integrated power-regulating charge system. The transmitted commands direct the integrated power-regulating charge system to deliver power to, or to cease delivering power to, the mobile computing device 10. To accomplish this, the mobile computing device 10 comprises a portable power source 11 which is preferably a rechargeable battery. Furthermore, the output terminal 3 is operatively coupled to a portable power source 11, wherein the output terminal 3 is used to recharge the portable power source 11. Consequently, the output terminal 3 is able to deliver electrical power to the portable power source 11. In a fifth alternate embodiment of the invention, the output terminal 3 and portable power source 11 are equipped with wireless charging systems. In this embodiment, the output terminal 3 uses electromagnetic fields to transfer electrical power to the portable power source 11. The mobile computing device 10 is communicably coupled to the wireless communication module 6. As a result, the mobile computing device 10 is able to wirelessly transmit commands to the integrated power-regulating charge system. In the preferred embodiment of the invention, the system for implementing the integrated power-regulating charge system further comprises a power cord 12. The output terminal 3 is electrically connected to the portable power source 11 by the power cord 12. As a result, the integrated power-regulating charge system is able to deliver electrical power to the mobile computing device 10 through the physically connection established through the power cord 12.

To implement the aforementioned system, the invention makes use of a software control system that is a program used initiate or terminate charging operations based on the amount of charge in the battery of a smartphone. The software control system comprises a user interface (UI) engine, a hysteresis engine, and an operation control engine. The term 'engine' is used herein to refer to collections of programs that are grouped based upon function. The software control system enables a user to set the amount of charge stored in a portable power source where the invention enables or inhibits current flow to a connected mobile computing device. That is, the UI engine enables the user to select the percentage of battery depletion where the operation control engine will generate a start command; instructing the invention to initiate a charging operation. Additionally, the UI engine is enables the user to set the percentage charge where the operation control engine generates a stop command; instructing the invention to terminate the charging operation.

Figure 7:
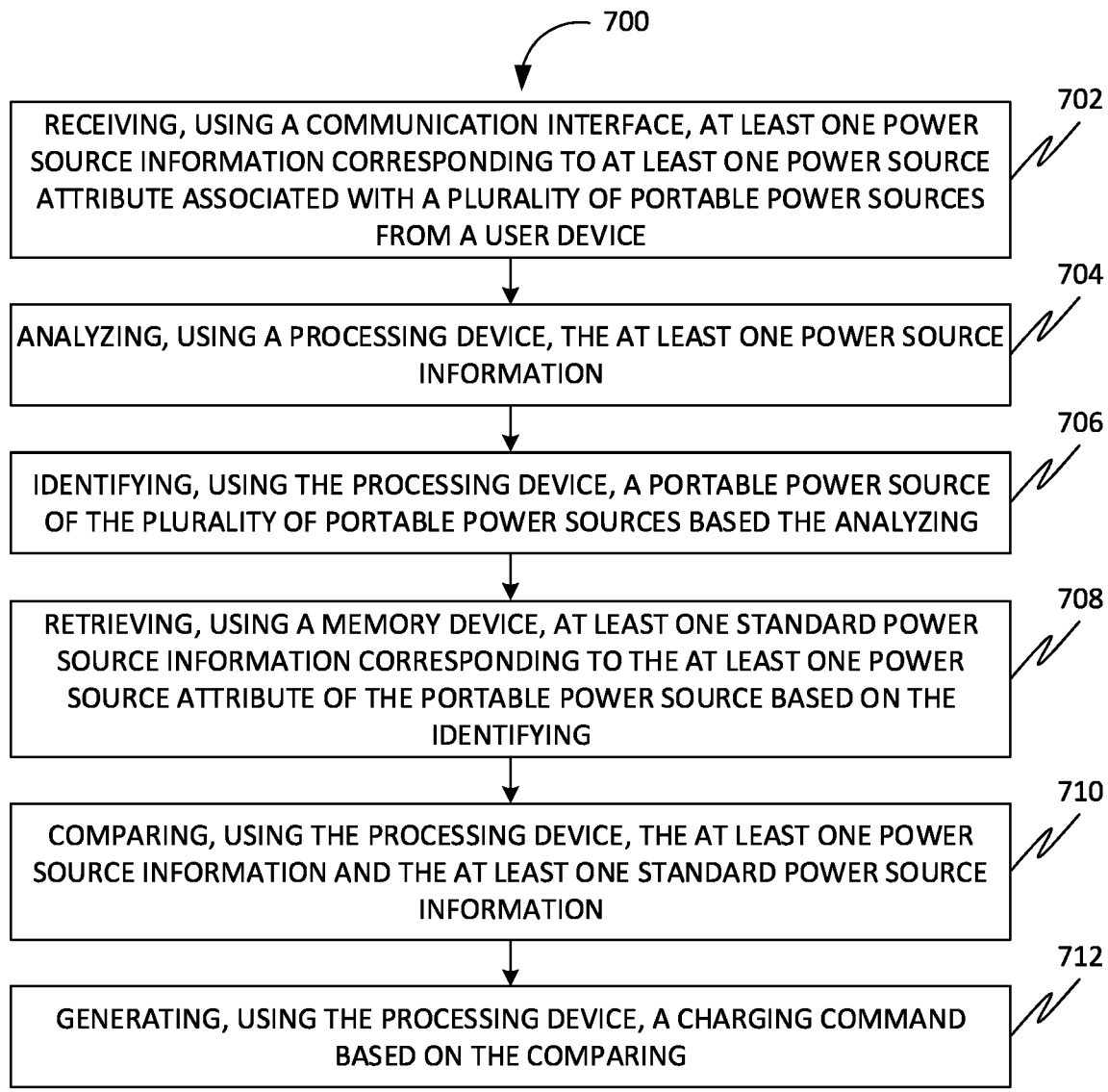
FIG. 7 is a flowchart of a method for facilitating charging of portable power sources using a charging system, in accordance with some embodiments.

FIG. 7 is a flowchart of a method 700 for facilitating charging of portable power sources using a charging system, in accordance with some embodiments. Further, at 702, the method 700 may include a step of receiving, using a communication interface, at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge.

Further, at 704, the method 700 may include a step of analyzing, using a processing device, the at least one power source information.

Further, at 706, the method 700 may include a step of identifying, using the processing device, a portable power source of the plurality of portable power sources based the analyzing.

Further, at 708, the method 700 may include a step of retrieving, using a memory device, at least one standard power source information corresponding to the at least one power source attribute of the portable power source based on the identifying. Further, a standard power source information of the at least one standard source information may include an optimal charge level corresponding to the power source charge.

Further, at 710, the method 700 may include a step of comparing, using the processing device, the at least one power source information and the at least one standard power source information.

Further, at 712, the method 700 may include a step of generating, using the processing device, a charging command based on the comparing. Further, the charging command incorporation with a shutoff switch of the charging system may be configured for charging the portable power source.

Figure 8:
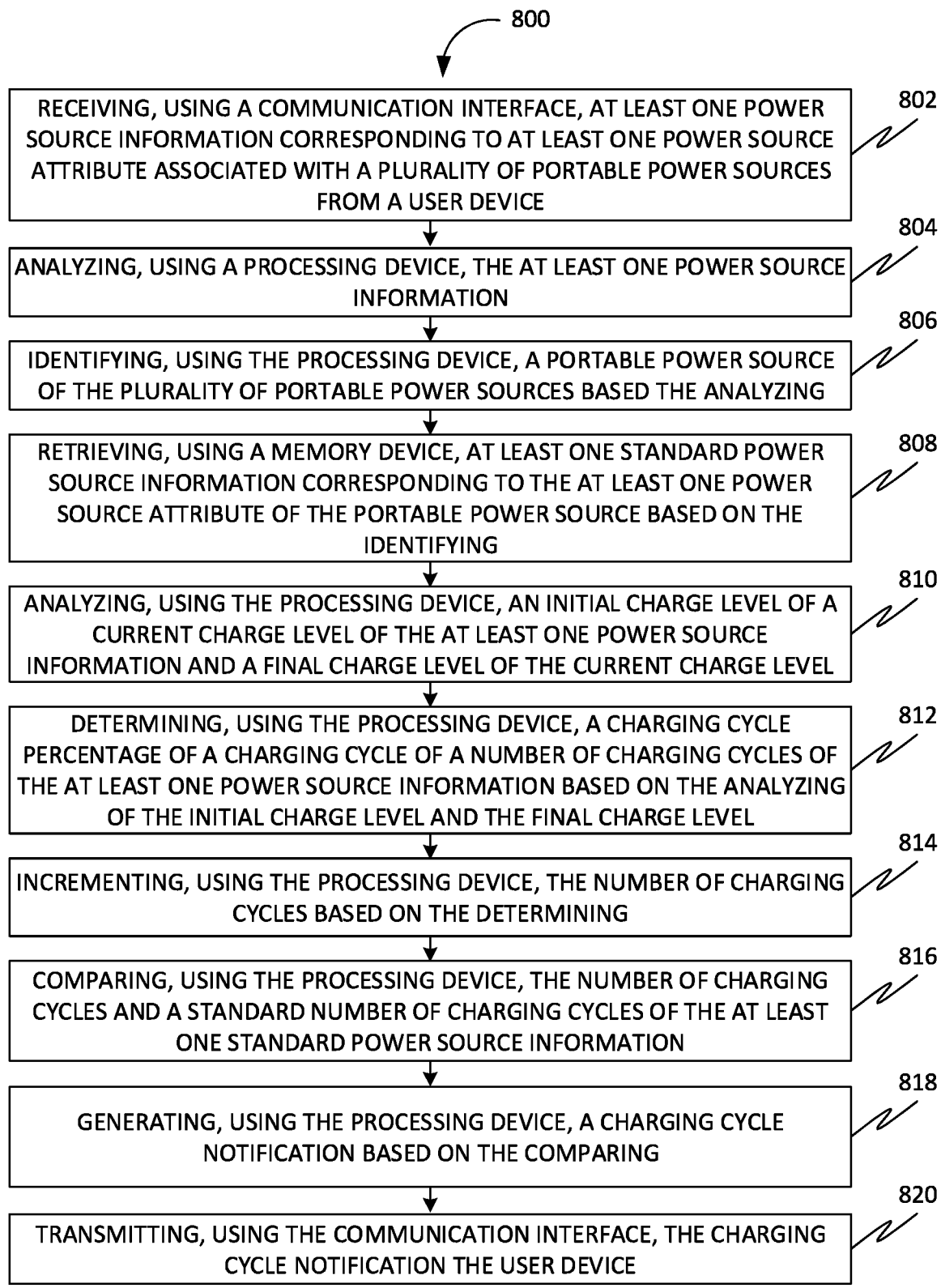
FIG. 8 is a flowchart of a method for facilitating determining charging cycles of portable power sources, in accordance with some embodiments.

FIG. 8 is a flowchart of a method 800 for facilitating determining charging cycles of portable power sources, in accordance with some embodiments. Further, at 802, the method 800 may include a step of receiving, using a communication interface, at least one power source information corresponding to at least one power source attribute associated with a plurality of portable power sources from a user device.

Further, at 804, the method 800 may include a step of analyzing, using a processing device, the at least one power source information.

Further, at 806, the method 800 may include a step of identifying, using the processing device, a portable power source of the plurality of portable power sources based the analyzing.

Further, at 808, the method 800 may include a step of retrieving, using a memory device, at least one standard power source information corresponding to the at least one power source attribute of the portable power source based on the identifying.

Further, at 810, the method 800 may include a step of analyzing, using the processing device, an initial charge level of a current charge level of the at least one power source information and a final charge level of the current charge level.

Further, at 812, the method 800 may include a step of determining, using the processing device, a charging cycle percentage of a charging cycle of a number of charging cycles of the at least one power source information based on the analyzing of the initial charge level and the final charge level.

Further, at 814, the method 800 may include a step of incrementing, using the processing device, the number of charging cycles based on the determining.

Further, at 816, the method 800 may include a step of comparing, using the processing device, the number of charging cycles and a standard number of charging cycles of the at least one standard power source information.

Further, at 818, the method 800 may include a step of generating, using the processing device, a charging cycle notification based on the comparing.

Further, at 820, the method 800 may include a step of transmitting, using the communication interface, the charging cycle notification the user device.

Further, the at least one power source information may include the number of charging cycles and the at least one standard power source information may include the standard number of charging cycles. Further, the current charge level may include the initial charge level corresponding to a first-time event and the final charge level corresponding to a second-time event.

Figure 9:
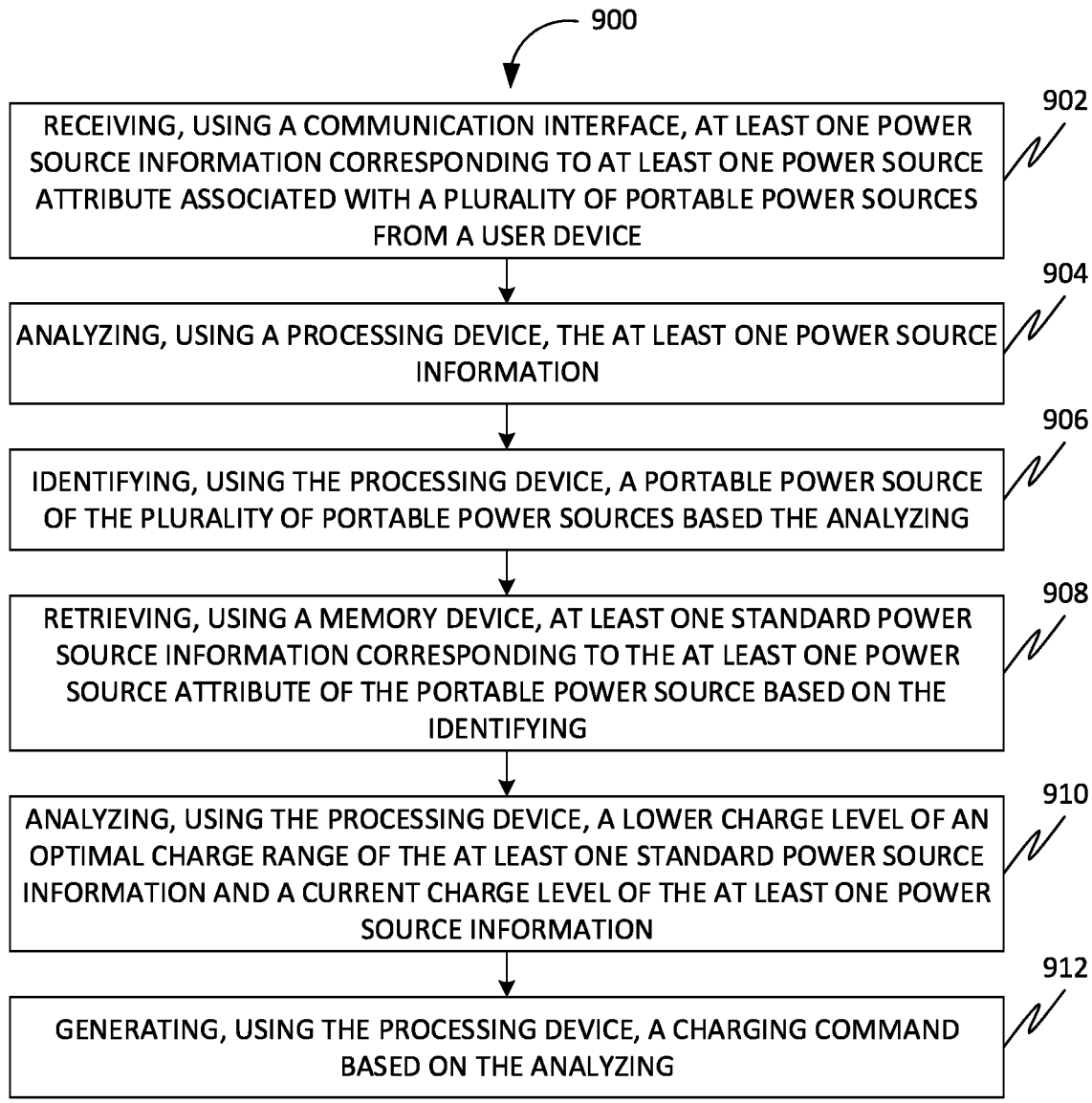
FIG. 9 is a flowchart of a method for facilitating initiating of charging for portable power sources, in accordance with some embodiments.

FIG. 9 is a flowchart of a method 900 for facilitating initiating of charging for portable power sources, in accordance with some embodiments. Further, at 902, the method 900 may include a step of receiving, using a communication interface, at least one power source information corresponding to at least one power source attribute associated with a plurality of portable power sources from a user device.

Further, at 904, the method 900 may include a step of analyzing, using a processing device, the at least one power source information.

Further, at 906, the method 900 may include a step of identifying, using the processing device, a portable power source of the plurality of portable power sources based the analyzing.

Further, at 908, the method 900 may include a step of retrieving, using a memory device, at least one standard power source information corresponding to the at least one power source attribute of the portable power source based on the identifying.

Further, at 910, the method 900 may include a step of analyzing, using the processing device, a lower charge level of an optimal charge range of the at least one standard power source information and a current charge level of the at least one power source information.

Further, at 912, the method 900 may include a step of generating, using the processing device, a charging command based on the analyzing. Further, the charging command incorporation with a shutoff switch of the charging system may be configured for charging the portable power source.

Further, the at least one power source attribute may include a power source charge. Further, the at least one power source information may include the current charge level corresponding to the power source charge. Further, the at least one standard power source information may include the optimal charge range corresponding to the power source charge of the at least one power source attribute. Further, the optimal charge range may include the lower charge level and the upper charge level. Further, the lower charge level corresponds to a first charge percentage of the power source charge. Further, the upper charge level corresponds to a second charge percentage of the power source charge. Further, the first charge percentage may be smaller than the second charge percentage.

Figure 10:
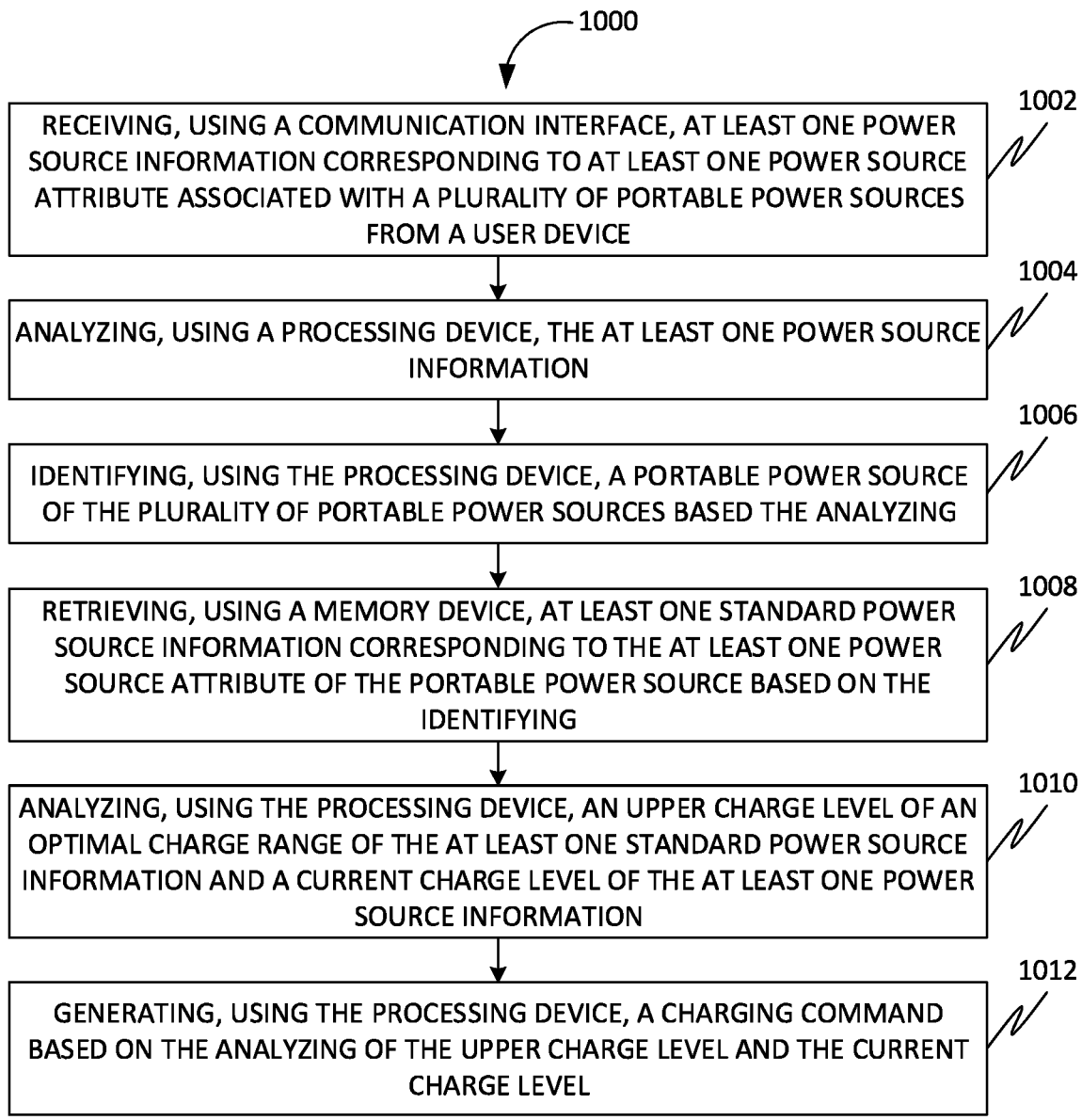
FIG. 10 is a flowchart of a method for facilitating terminating of charging for portable power sources, in accordance with some embodiments.

FIG. 10 is a flowchart of a method 1000 for facilitating terminating of charging for portable power sources, in accordance with some embodiments. Further, at 1002, the method 1000 may include a step of receiving, using a communication interface, at least one power source information corresponding to at least one power source attribute associated with a plurality of portable power sources from a user device.

Further, at 1004, the method 1000 may include a step of analyzing, using a processing device, the at least one power source information.

Further, at 1006, the method 1000 may include a step of identifying, using the processing device, a portable power source of the plurality of portable power sources based the analyzing.

Further, at 1008, the method 1000 may include a step of retrieving, using a memory device, at least one standard power source information corresponding to the at least one power source attribute of the portable power source based on the identifying.

Further, at 1010, the method 1000 may include a step of analyzing, using the processing device, an upper charge level of an optimal charge range of the at least one standard power source information and a current charge level of the at least one power source information.

Further, at 1012, the method 1000 may include a step of generating, using the processing device, a charging command based on the analyzing of the upper charge level and the current charge level. Further, the charging command incorporation with a shutoff switch of the charging system may be configured for charging the portable power source.

Further, the at least one power source attribute may include a power source charge. Further, the at least one power source information may include the current charge level corresponding to the power source charge. Further, the at least one standard power source information may include an optimal charge range corresponding to the power source charge. Further, the optimal charge range may include the lower charge level and the upper charge level. Further, the lower charge level corresponds to a first charge percentage of the power source charge. Further, the upper charge level corresponds to a second charge percentage of the power source charge. Further, the first charge percentage may be smaller than the second charge percentage.

Figure 11:
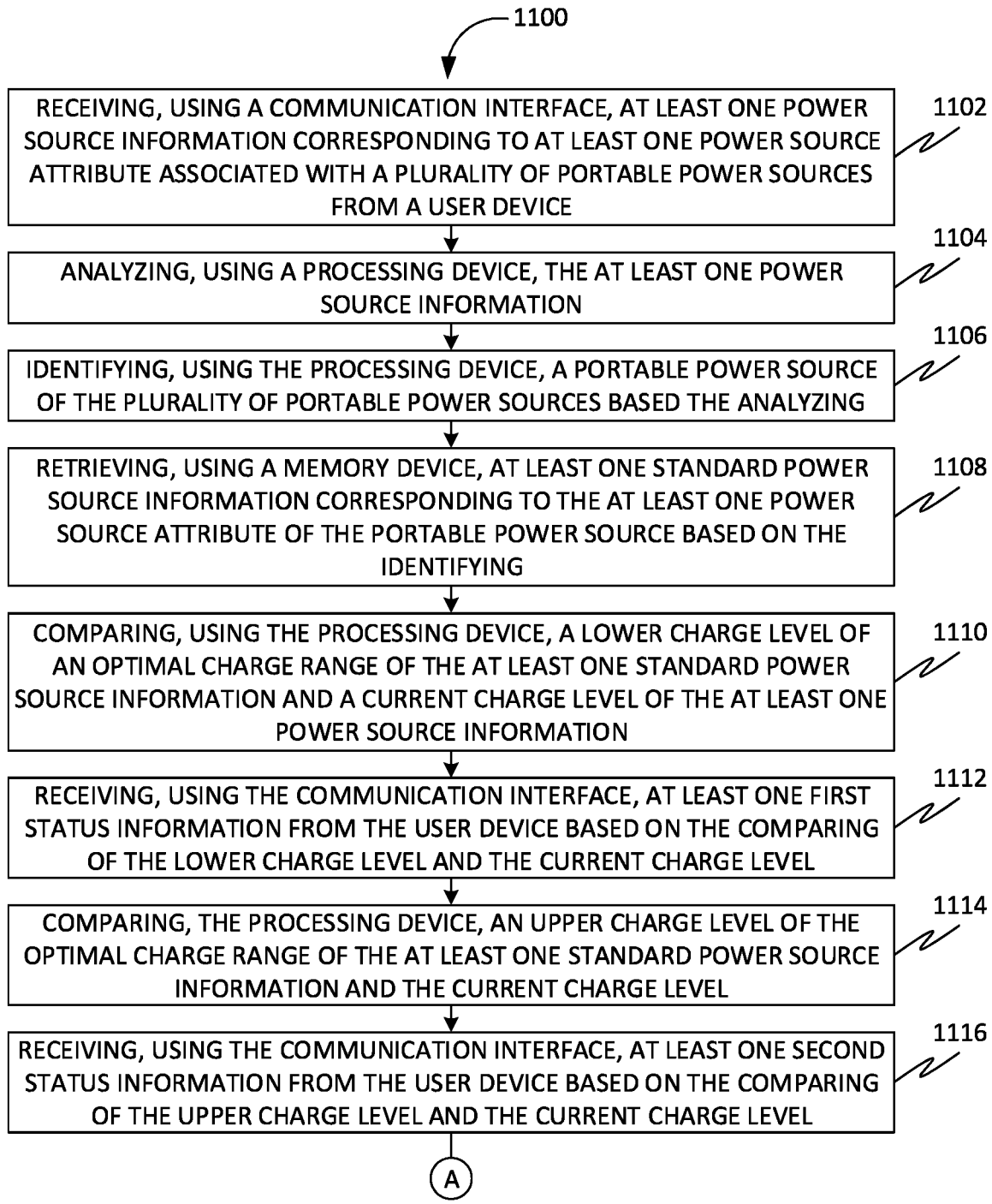
FIG. 11 is a flowchart of a method for facilitating determining of optimal charging ranges for portable power sources, in accordance with some embodiments.

FIG. 11 is a flowchart of a method 1100 for facilitating determining of optimal charging ranges for portable power sources, in accordance with some embodiments. Further, at 1102, the method 1100 may include a step of receiving, using a communication interface, at least one power source information corresponding to at least one power source attribute associated with a plurality of portable power sources from a user device.

Further, at 1104, the method 1100 may include a step of analyzing, using a processing device, the at least one power source information.

Further, at 1106, the method 1100 may include a step of identifying, using the processing device, a portable power source of the plurality of portable power sources based the analyzing.

Further, at 1108, the method 1100 may include a step of retrieving, using a memory device, at least one standard power source information corresponding to the at least one power source attribute of the portable power source based on the identifying.

Further, at 1110, the method 1100 may include a step of comparing, using the processing device, a lower charge level of an optimal charge range of the at least one standard power source information and a current charge level of the at least one power source information.

Further, at 1112, the method 1100 may include a step of receiving, using the communication interface, at least one first status information from the user device based on the comparing of the lower charge level and the current charge level.

Further, at 1114, the method 1100 may include a step of comparing, the processing device, an upper charge level of the optimal charge range of the at least one standard power source information and the current charge level.

Further, at 1116, the method 1100 may include a step of receiving, using the communication interface, at least one second status information from the user device based on the comparing of the upper charge level and the current charge level.

Figure 12:
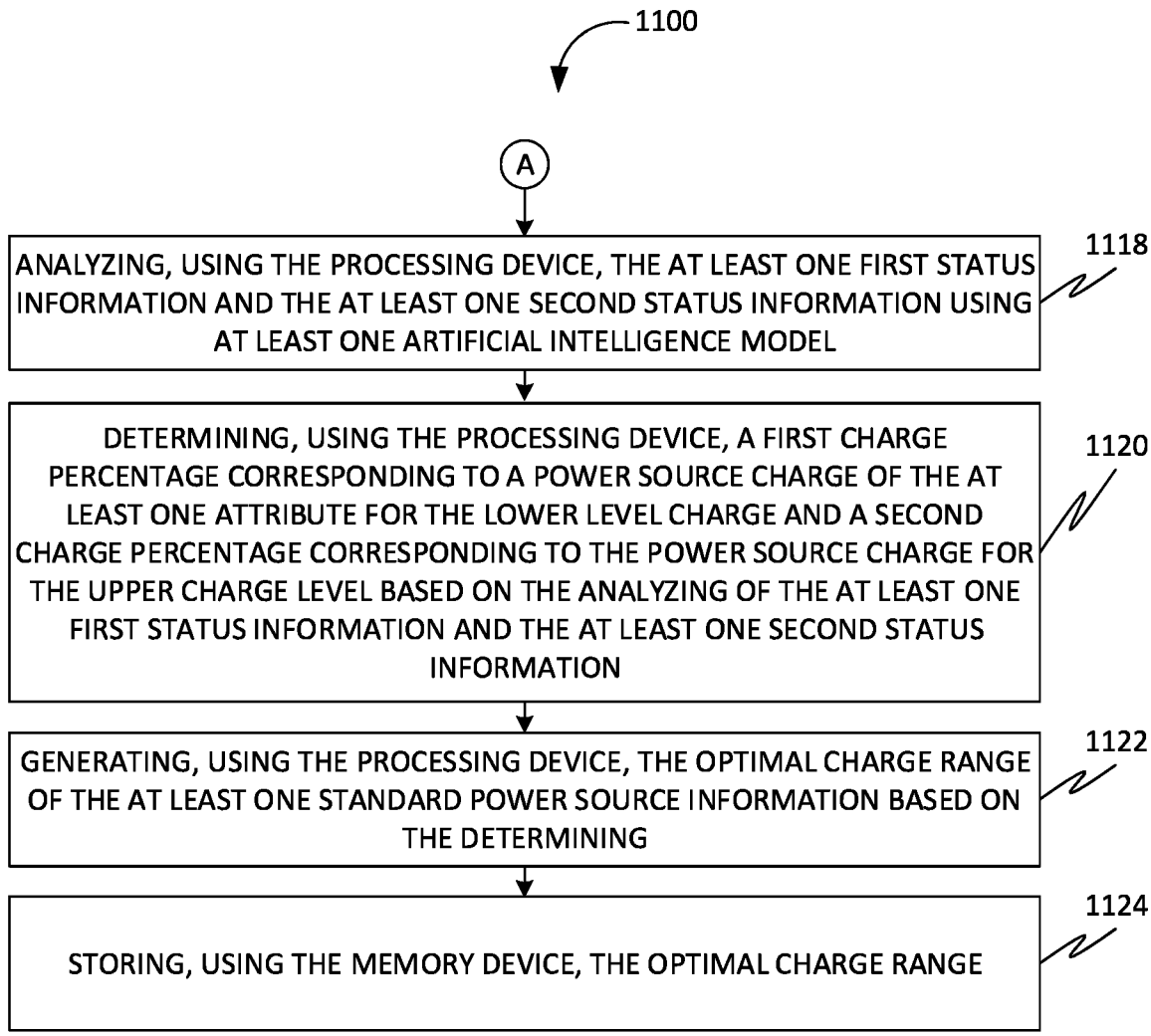
FIG. 12 is a continuation flowchart of the method for facilitating the determining of the optimal charging ranges for the portable power sources, in accordance with some embodiments.

FIG. 12 is a continuation flowchart of the method 1100 for facilitating the determining of the optimal charging ranges for the portable power sources, in accordance with some embodiments. Further, at 1118, the method 1100 may include a step of analyzing, using the processing device, the at least one first status information and the at least one second status information using at least one artificial intelligence model.

Further, at 1120, the method 1100 may include a step of determining, using the processing device, a first charge percentage corresponding to a power source charge of the at least one attribute for the lower level charge and a second charge percentage corresponding to the power source charge for the upper charge level based on the analyzing of the at least one first status and the at least one second status.

Further, at 1122, the method 1100 may include a step of generating, using the processing device, the optimal charge range of the at least one standard power source information based on the determining Further, at 1124, the method 1100 may include a step of storing, using the memory device, the optimal charge range.

Further, the at least one power source attribute may include a power source charge. Further, the at least one power source information may include the current charge level corresponding to the power source charge. Further, the at least one standard power source information may include the optimal charge range corresponding to the power source charge.

Further, the optimal charge range may include the lower charge level and the upper charge level. Further, the lower charge level corresponds to the first charge percentage of the power source charge. Further, the upper charge level corresponds to the second charge percentage of the power source charge. Further, the first charge percentage may be smaller than the second charge percentage. Further, the at least one first status information may include a temperature status, a voltage status, etc. of the portable power source. Further, the at least one second status information may include a temperature status, a voltage status, etc. of the portable power source.

Figure 13:
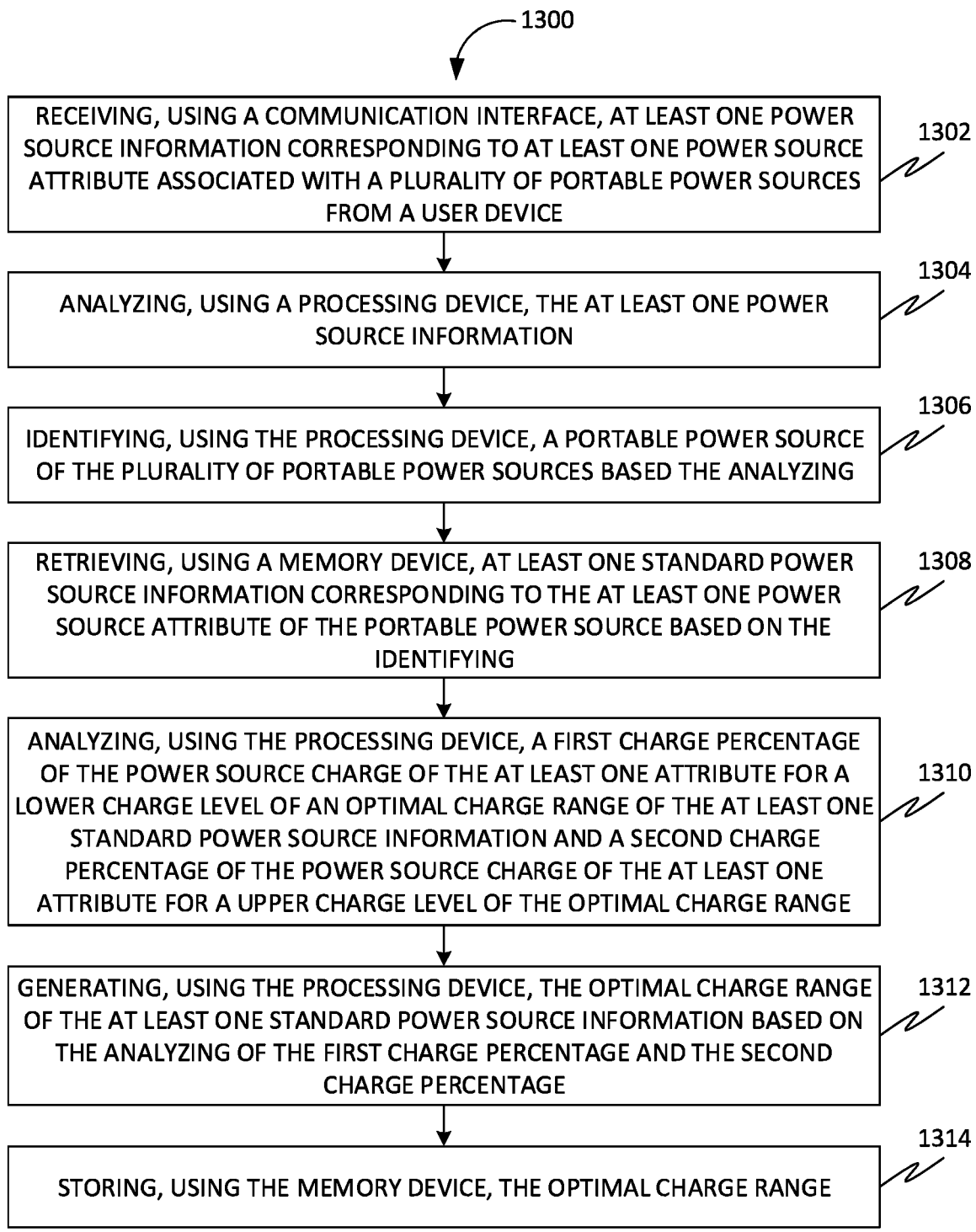
FIG. 13 is a flowchart of a method for generating of optimal charging ranges for portable power sources, in accordance with some embodiments.

FIG. 13 is a flowchart of a method 1300 for generating of optimal charging ranges for portable power sources, in accordance with some embodiments. Further, at 1302, the method 1300 may include a step of receiving, using a communication interface, at least one power source information corresponding to at least one power source attribute associated with a plurality of portable power sources from a user device.

Further, at 1304, the method 1300 may include a step of analyzing, using a processing device, the at least one power source information.

Further, at 1306, the method 1300 may include a step of identifying, using the processing device, a portable power source of the plurality of portable power sources based the analyzing.

Further, at 1308, the method 1300 may include a step of retrieving, using a memory device, at least one standard power source information corresponding to the at least one power source attribute of the portable power source based on the identifying.

Further, at 1310, the method 1300 may include a step of analyzing, using the processing device, a first charge percentage of the power source charge of the at least one attribute for a lower charge level of a optimal charge range of the at least one standard power source information and a second charge percentage of the power source charge of the at least one attribute for a upper charge level of the optimal charge range.

Further, at 1312, the method 1300 may include a step of generating, using the processing device, the optimal charge range of the at least one standard power source information based on the analyzing of the first charge percentage and the second charge percentage.

Further, at 1314, the method 1300 may include a step of storing, using the memory device, the optimal charge range. Further, the at least one power source attribute may include a power source charge.

Further, the at least one power source information may include the current charge level corresponding to the power source charge. Further, the at least one standard power source information may include the optimal charge range corresponding to the power source charge.

Further, the optimal charge range may include the lower charge level and the upper charge level. Further, the lower charge level corresponds to the first charge percentage of the power source charge. Further, the upper charge level corresponds to the second charge percentage of the power source charge. Further, the first charge percentage may be smaller than the second charge percentage.

Figure 14:
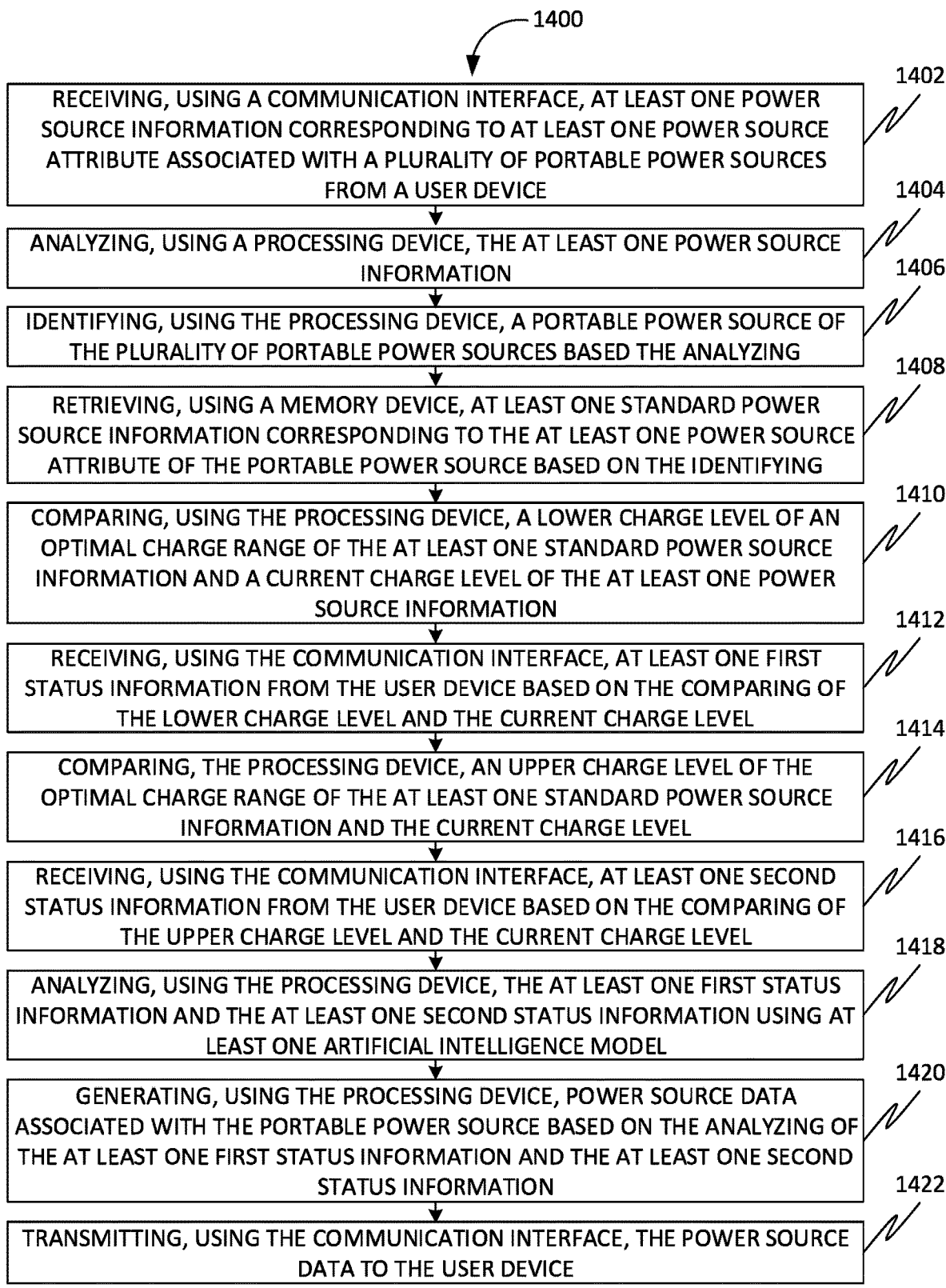
FIG. 14 is a flowchart of a method for facilitating monitoring of portable power sources, in accordance with some embodiments.

FIG. 14 is a flowchart of a method 1400 for facilitating monitoring of portable power sources, in accordance with some embodiments. Further, at 1402, the method 1400 may include a step of receiving, using a communication interface, at least one power source information corresponding to at least one power source attribute associated with a plurality of portable power sources from a user device.

Further, at 1404, the method 1400 may include a step of analyzing, using a processing device, the at least one power source information.

Further, at 1406, the method 1400 may include a step of identifying, using the processing device, a portable power source of the plurality of portable power sources based the analyzing.

Further, at 1408, the method 1400 may include a step of retrieving, using a memory device, at least one standard power source information corresponding to the at least one power source attribute of the portable power source based on the identifying.

Further, at 1410, the method 1400 may include a step of comparing, using the processing device, a lower charge level of an optimal charge range of the at least one standard power source information and a current charge level of the at least one power source information.

Further, at 1412, the method 1400 may include a step of receiving, using the communication interface, at least one first status information from the user device based on the comparing of the lower charge level and the current charge level.

Further, at 1414, the method 1400 may include a step of comparing, the processing device, an upper charge level of the optimal charge range of the at least one standard power source information and the current charge level.

Further, at 1416, the method 1400 may include a step of receiving, using the communication interface, at least one second status information from the user device based on the comparing of the upper charge level and the current charge level.

Further, at 1418, the method 1400 may include a step of analyzing, using the processing device, the at least one first status information and the at least one second status information using at least one artificial intelligence model.

Further, at 1420, the method 1400 may include a step of generating, using the processing device, power source data associated with the portable power source based on the analyzing of the at least one first status information and the at least one second status information.

Further, at 1422, the method 1400 may include a step of transmitting, using the communication interface, the power source data to the user device.

Further, the at least one power source attribute may include a power source charge. Further, the at least one power source information may include the current charge level corresponding to the power source charge. Further, the at least one standard power source information may include the optimal charge range corresponding to the power source charge. Further, the optimal charge range may include the lower charge level and the upper charge level.

Figure 15:
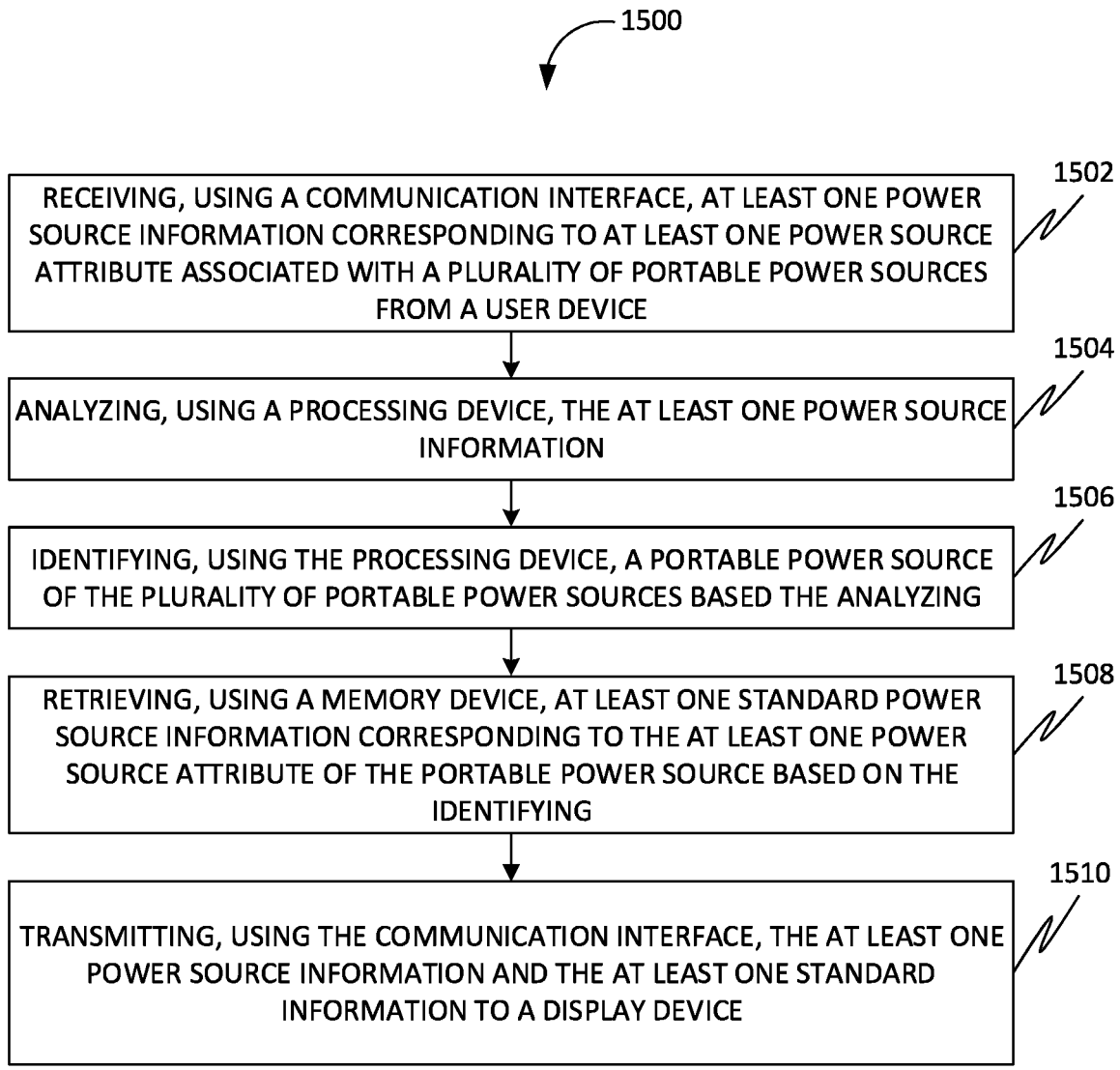
FIG. 15 is a flowchart of a method for facilitating displaying of power source information of power sources, in accordance with some embodiments.

FIG. 15 is a flowchart of a method 1500 for facilitating displaying of power source information of power sources, in accordance with some embodiments. Further, at 1502, the method of 1500 may include a step of receiving, using a communication interface, at least one power source information corresponding to at least one power source attribute associated with a plurality of portable power sources from a user device.

Further, at 1504, the method of 1500 may include a step of analyzing, using a processing device, the at least one power source information.

Further, at 1506, the method of 1500 may include a step of identifying, using the processing device, a portable power source of the plurality of portable power sources based the analyzing.

Further, at 1508, the method of 1500 may include a step of retrieving, using a memory device, at least one standard power source information corresponding to the at least one power source attribute of the portable power source based on the identifying.

Further, at 1510, the method of 1500 may include a step of transmitting, using the communication interface, the at least one power source information and the at least one standard information to a display device, wherein the display device is configured for presenting the at least one power source information.

Figure 16:
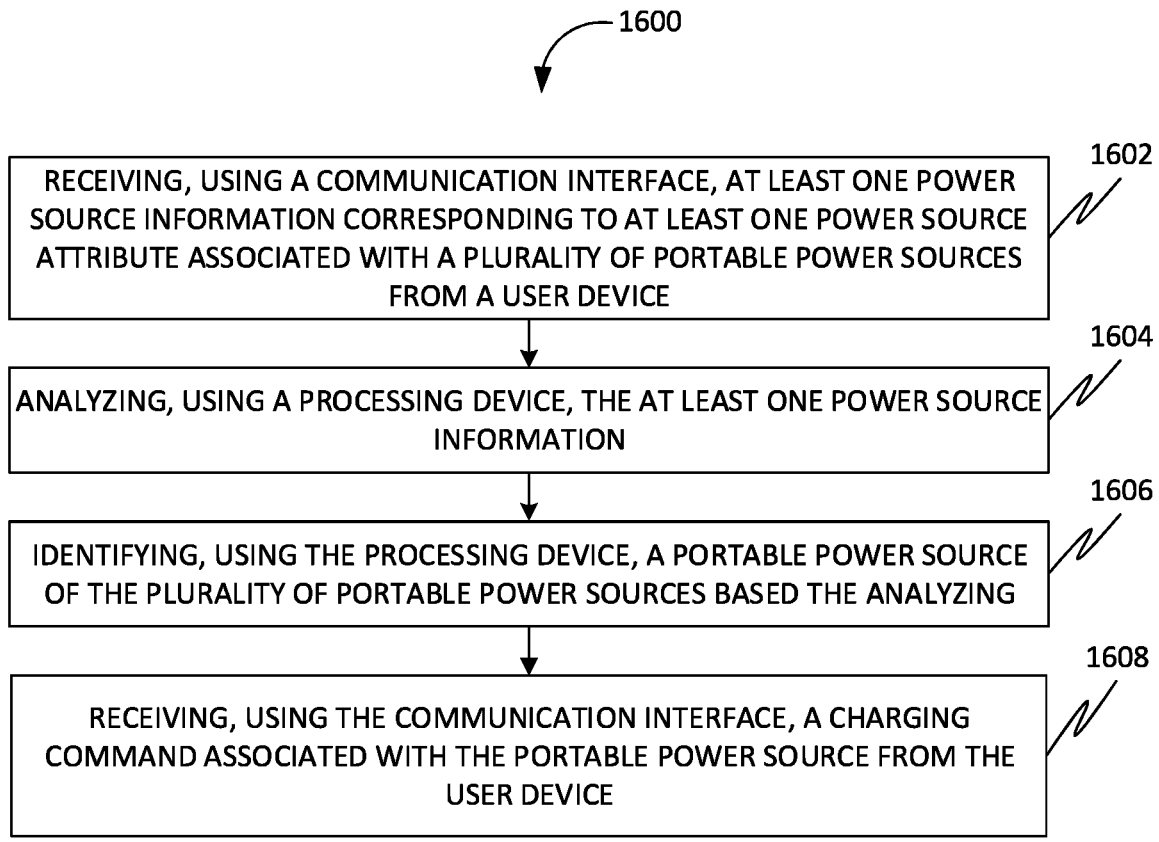
FIG. 16 is a flowchart of a method for facilitating charging of portable power sources based on charging commands, in accordance with some embodiments.

FIG. 16 is a flowchart of a method 1600 for facilitating charging of portable power sources based on charging commands, in accordance with some embodiments. Further, at 1602, the method 1600 may include a step of receiving, using a communication interface, at least one power source information corresponding to at least one power source attribute associated with a plurality of portable power sources from a user device.

Further, at 1604, the method 1600 may include a step of analyzing, using a processing device, the at least one power source information.

Further, at 1606, the method 1600 may include a step of identifying, using the processing device, a portable power source of the plurality of portable power sources based the analyzing.

Further, at 1608, the method 1600 may include a step of receiving, using the communication interface, a charging command associated with the portable power source from the user device. Further, the charging command incorporation with a shutoff switch of the charging system may be configured for charging the portable power source.

Figure 17:
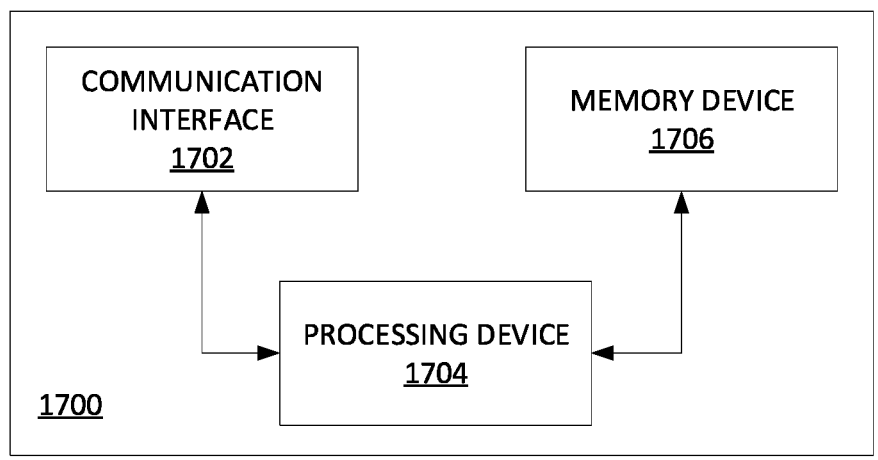
FIG. 17 is a block diagram of a charging system for facilitating charging of portable power sources, in accordance with some embodiments.

FIG. 17 is a block diagram of a charging system 1700 for facilitating charging of portable power sources, in accordance with some embodiments. Further, the charging system 1700 may include a communication interface 1702, a processing device 1704, and a memory device 1706.

Further, the communication interface 1702 may be configured for receiving at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge.

Further, the processing device 1704 may be communicatively coupled with the communication interface 1702. Further, the processing device 1704 may be configured for analyzing the at least one power source information. Further, the processing device 1704 may be configured for identifying a portable power source of the plurality of portable power sources based the analyzing. Further, the processing device 1704 may be configured for comparing the at least one power source information and at least one standard power source information corresponding to the at least one power source attribute of the portable power source. Further, a standard power source information of the at least one standard source information may include an optimal charge level corresponding to the power source charge. Further, the processing device 1704 may be configured for generating a charging command based on the comparing. Further, the charging command incorporation with a shutoff switch of the charging system 1700 may be configured for charging the portable power source; and Further, the memory device 1706 may be communicatively coupled with the processing device 1704. Further, the memory device 1706 may be configured for retrieving the at least one standard power source information based on the identifying.

Further, in some embodiments, the at least one power source information may include a number of charging cycles and the at least one standard power source information may include a standard number of charging cycles. Further, the current charge level may include an initial charge level corresponding to a first-time event and a final charge level corresponding to a second-time event. Further, the processing device 1704 may be configured for analyzing the initial charge level and the final charge level. Further, the processing device 1704 may be configured for determining a charging cycle percentage of a charging cycle based on the analyzing of the initial charge level and the final charge level. Further, the processing device 1704 may be configured for incrementing the number of charging cycles based on the determining. Further, the processing device 1704 may be configured for comparing the number of charging cycles and the standard number of charging cycles. Further, the processing device 1704 may be configured for generating a charging cycle notification based on the comparing of the number of charging cycles and the standard number of charging cycles. Further, the communication interface 1702 may be configured for transmitting the charging cycle notification the user device.

Further, in some embodiments, the at least one standard power source information may include an optimal charge range corresponding to the power source charge. Further, the optimal charge range may include a lower charge level and an upper charge level. Further, the lower charge level may be a first charge percentage of the power source charge. Further, the upper charge level may be a second charge percentage of the power source charge. Further, the first charge percentage may be smaller than the second charge percentage. Further, in an embodiment, the processing device 1704 may be further configured for analyzing the lower charge level and the current charge level. Further, the processing device 1704 may be further configured for generating the charging command based on the analyzing of the lower charge level and the current charge level. Further, the charging command incorporation with the shutoff switch of the charging system 1700 configured for initiating charging the portable power source. Further, in an embodiment, the processing device 1704 may be further configured for analyzing the upper charge level and the current charge level. Further, the processing device 1704 may be further configured for generating the charging command based on the analyzing of the upper charge level and the current charge level. Further, the charging command incorporation with the shutoff switch of the charging system 1700 configured for terminating charging the portable power source. Further, in an embodiment, the processing device 1704 may be further configured for comparing the lower charge level and the current charge level. Further, the processing device 1704 may be configured for comparing the upper charge level and the current charge level. Further, the processing device 1704 may be configured for analyzing at least one first status information and at least one second status information using at least one artificial intelligence model. Further, the processing device 1704 may be configured for determining the first charge percentage corresponding to the power source charge for the lower level charge and the second charge percentage corresponding to the power source charge for the upper charge level based on the analyzing of the at least one first status information and the at least one second status information. Further, the processing device 1704 may be configured for generating the optimal charge range of the at least one standard power source information based on the determining. Further, the communication interface 1702 may be configured for receiving the at least one first status information associated with the portable power source from the user device based on the comparing of the lower charge level and the current charge level. Further, the communication interface 1702 may be configured for receiving the at least one second status information associated with the portable power source from the user device based on the comparing of the upper charge level and the current charge level. Further, the memory device 1706 may be configured for storing the optimal charge range. Further, in an embodiment, the processing device 1704 may be configured for generating power source data associated with the portable power source based on the analyzing of the at least one first status information and the at least one second status information. Further, the communication interface 1702 may be configured for transmitting the power source data to the user device. Further, in an embodiment, the communication interface 1702 may be configured for receiving the first charge percentage corresponding to the power source charge for the lower charge level from the user device. Further, the communication interface 1702 may be configured for receiving the second charge percentage corresponding to the power source charge for the upper charge level from the user device. Further, the processing device 1704 may be configured for analyzing the first charge percentage and the second charge percentage. Further, the processing device 1704 may be configured for generating the optimal charge range of the at least one standard power source information based on the analyzing of the first charge percentage and the second charge percentage. Further, the memory device 1706 may be configured for storing the optimal charge range.

Further, in some embodiments, the communication interface 1702 may be configured for transmitting the at least one power source information and the at least one standard power source information to a display device. Further, the display device may be configured for presenting the at least one power source information and the at least one standard power source information.

Figure 18:
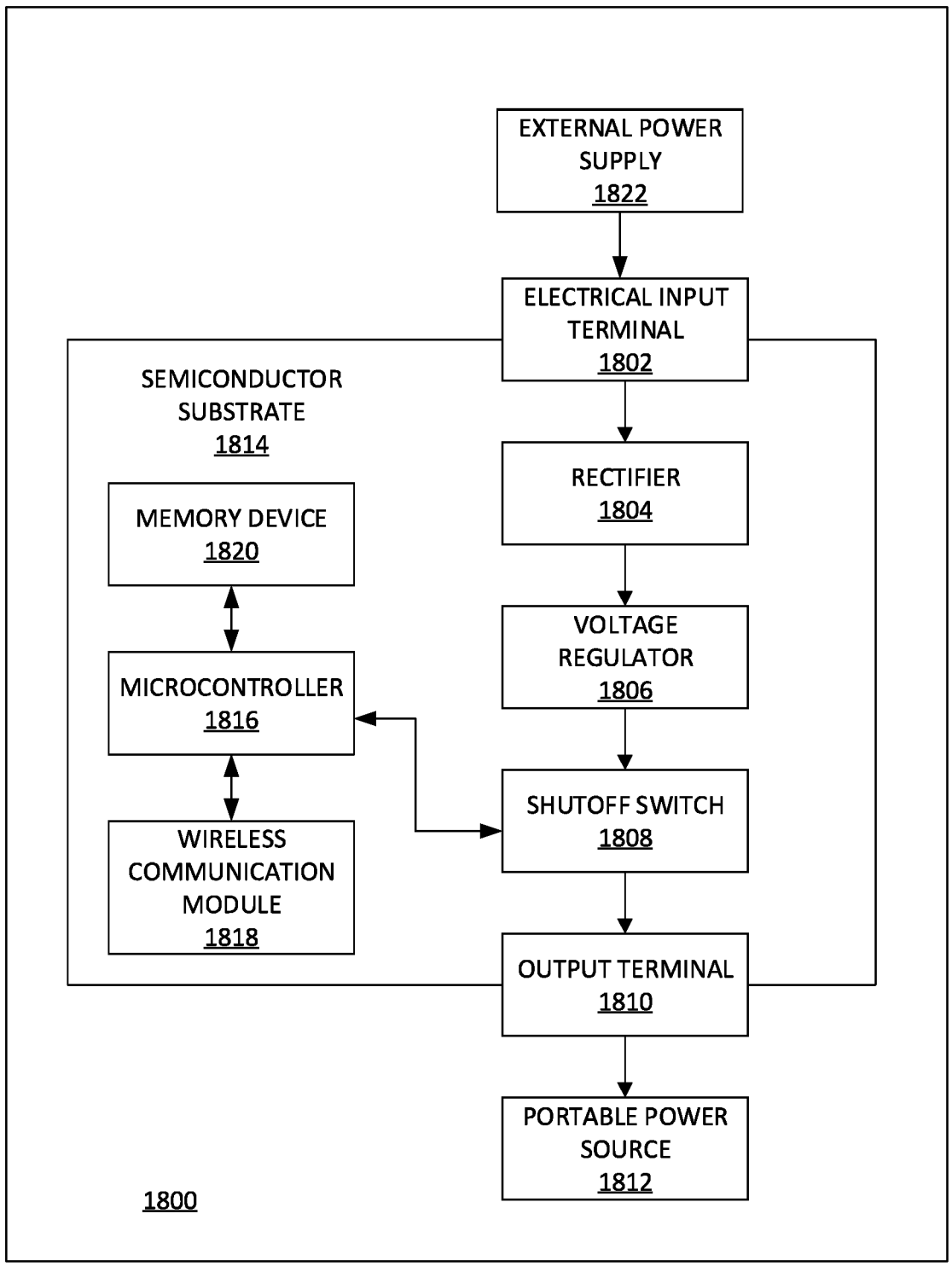
FIG. 18 is a block diagram of a charging system for facilitating charging of portable power sources, in accordance with some embodiments.

FIG. 18 is a block diagram of a charging system 1800 for facilitating charging of portable power sources, in accordance with some embodiments. Further, the charging system 1800 may include an electrical input terminal 1802, an output terminal 1810, a shutoff switch 1808, a microcontroller 1816, a wireless communication module 1818, a rectifier 1804, a voltage regulator 1806, a semiconductor substrate 1814, an external power supply 1822, a portable power source 1812, and a memory device 1820.

Further, the rectifier 1804, the voltage regulator 1806 and the shutoff switch 1808 being electrically integrated in between the electrical input terminal 1802 and the output terminal 1810. Further, the electrical input terminal 1802 is electrically connected to the portable power source 1812 sequentially through the rectifier 1804, the voltage regulator 1806, the shutoff switch 1808 and the output terminal 1810.

Further, the microcontroller 1816 is electronically connected to the shutoff switch 1808.

Further, the wireless communication module 1818 is electronically connected to the microcontroller 1816.

Further, the electrical input terminal 1802 is externally mounted onto the semiconductor substrate 1814.

Further, the output terminal 1810 is externally mounted onto the semiconductor substrate 1814.

Further, the output terminal 1810 is positioned offset from the electrical input terminal 1802 across the semiconductor substrate 1814.

Further, the electrical input terminal 1802, the rectifier 1804, the voltage regulator 1806, the shutoff switch 1808, the output terminal 1810, the microcontroller 1816 and the wireless communication module 1818 being operatively coupled to the semiconductor substrate 1814 via electrical connections between the electrical input terminal 1802, the rectifier 1804, the voltage regulator 1806, the shutoff switch 1808, the output terminal 1810, the microcontroller 1816 and the wireless communication module 1818 established by the semiconductor substrate 1814.

Further, the output terminal 1810 is operatively coupled to the portable power source 1812.

Further, the electrical input terminal 1802 is operatively coupled to the external power supply 1822.

Further, the wireless communication module 1818 may be configured for receiving at least one power source information corresponding to at least one power source attribute associated with a plurality of portable power sources from a user device. Further, a power source attribute of the at least one power source attribute may include a power source charge. Further, a power source information of the at least one power source information may include a current charge level corresponding to the power source charge.

Further, the memory device 1820 configured for storing the at least one power source information. Further, the memory device 1820 configured for at least one standard power source information corresponding to the at least one power source attribute associated with a plurality portable power sources comprised in the user device.

Further, the microcontroller 1816 may be configured for analyzing the at least one power source information. Further, the microcontroller 1816 may be configured for identifying a portable power source 1812 of the plurality of power sources based on the analyzing. Further, the microcontroller 1816 may be configured for retrieving the at least one standard power source information corresponding to the at least one power source attribute associated with the power source based on the identifying. Further, a standard power source information of the at least one standard source information may include an optimal charge level corresponding to the power source charge. Further, the microcontroller 1816 may be configured for comparing the at least one power source information and the at least one standard power source information. Further, the microcontroller 1816 may be configured for controlling the shutoff switch 1808 based on the comparing. Further, the shutoff switch 1808 facilitates the charging of the portable power source 1812.

In further embodiments, the charging system 1800 may include a smart charging device used to reduce power consumption and extend the life of a rechargeable battery. The smart charging device may include a charging device and a software control system. Further, the smart charging device may use a software-controlled hysteresis system to govern the amount of charge delivered to the battery of a smartphone. Further, the software control system actively measures the amount of charge within the battery of the smartphone on which it is installed. The software control system uses the acquired charge measurements to generate control signals that direct the charging device to initiate or terminate a charging operation. The term 'charging operation' refers to the act of delivering power from the charging device to the battery of a connected smartphone. Additionally, the term 'smartphone' is used herein as a generic description, and can refer to any mobile device that has a rechargeable battery and is capable of running the software control system. Further, the charging device is a smart charger used to deliver condition electrical power to the battery of a smartphone. The charging device comprises a housing, an outlet interconnect, a printed circuit board (PCB), a visual indicator array, and a power circuit. Further, the charging device may communicate with the software control system of a connected smartphone. The housing is a rigid enclosure used to maintain the electronic components of the smart charging device in positions that facilitate connecting the charging device to smartphones and to external power sources. The housing comprises a PCB mount, an indicator mount, an outlet mount, and an external device port. Further, the housing is ergonomically shaped to enable a user to easily plug the outlet interconnect into external power supplies, such as wall sockets, surge protectors, extension cords, and the like. Further, the PCB mount is located within the housing and maintains the PCB in a desired position. Further, the PCB mount forms a detachable connection with the housing fastener of the PCB. The indicator mount maintains the visual indicator array in a desired position on the exterior surface of the housing. The outlet mount fixedly connects the outlet interconnect to the housing. This connection facilitates connection the outlet interconnect to an external power supply. The external device port is a hole traversing through one side of the housing. External devices are able to connect to the external device interconnect of the power circuit. Further, the outlet interconnect is an electrical outlet plug used to electrically and mechanically couple the housing to an external electrical outlet. Further, the outlet interconnect is a pronged male connection device designed to be inserted into the female receptacle of an outlet. The outlet interconnect extends from the housing, such that electrical power delivered from an external power supply is transferred through the housing, and into the power circuit. Further, the smart charging device may be manufactured with outlet interconnects designed to meet the specifications for types A through O of the international standards for electrical outlet plugs. Further, the PCB mechanically supports and electronically connects the electronic components of the charging device. The PCB comprises a microcontroller, a wireless radio, and a housing fastener. Further, the PCB with an attached microcontroller is capable of executing commands generated by the software control system. That is, the microcontroller governs the operation of the electronic components of the charging device based on instructions issued by the software control system. The wireless radio connects and communicates with external devices via wireless data transmission protocols such as Bluetooth, WI-FI, GSM, CDMA, ZigBee, and the like. Further, the PCB is equipped with electronic components capable of assessing the level of charge in the battery of a connected smartphone. Further, the charging device is able to initiate and terminate charging operations without receiving commands from the software control system. Further, the visual indicator array is a plurality of light-emitting diodes (LED) positioned on the exterior surface of the housing. Further, the visual indicator array illuminates one or more LEDs to indicate the charge in a connected device, as well as the state of the current charging operation. Further, the visual indicator array is a digital display capable of rendering text and graphics to convey pertinent information. Further, the charging device is designed with a speaker capable of generating audible notifications. Further, the power circuit maintains the electronic components of the charging device in electrical communication with the PCB. The power circuit comprises a power conditioner and an external device interconnect. Further, the power conditioner functions as a transformer and AC to DC converter. The charging devices use these components to modify the electrical power delivered through the outlet interconnect, such that a connected smartphone will not be damaged during a charging operation. Further, the external device interconnect is a female receptacle into which a charging cable is inserted. The connection established between the external device interconnect and an attached charging cable enables the charging device to deliver power through the charging cable. Once a user connects the charging cable to the charging port of a smartphone, the charging device is able to initiate a charging operation. Further, the power circuit is equipped with a charging cable that can be connected to the charging port of a smartphone. Further, the power circuit is equipped with a wireless charging device. Further, the charging device is capable of delivering power to a smartphone without first establishing a physical connection. Further, the software control system is a program used to initiate or terminate charging operations based on the amount of charge in the battery of a smartphone. The software control system comprises a user interface (UI) engine, a hysteresis engine, and an operation control engine. The term 'engine' is used herein to refer to collections of programs that are grouped based upon function. Further, the software control system enables a user to set the points where the charging device initiates or terminates charging operations. That is, the UI engine enables the user to select the percentage of battery depletion where the operation control engine will generate a start command; instructing the charging device to initiate a charging operation. Additionally, the UI engine enables the user to set the percentage charge where the operation control engine generates a stop command; instructing the charging device to terminate the charging operation. Further, the UI engine is tasked with generation graphical user interfaces, as well as interpreting user input. Further, the UI engine functions as a control panel that enables the user to dictate the operational parameters of the software control system and the charging device. The hysteresis engine actively monitors the charge within the battery. When this charge reaches user-defined thresholds, the hysteresis engine directs the operation control engine to generate the appropriate commands. Further, the operation control engine generates instructions for the charging device to execute. Additionally, the operation control engine is tasked with coordinating communication between the software control system and the charging device. In this way, the operation control engine is able to monitor the state of the charging device while dictating its operation.

Figure 19:
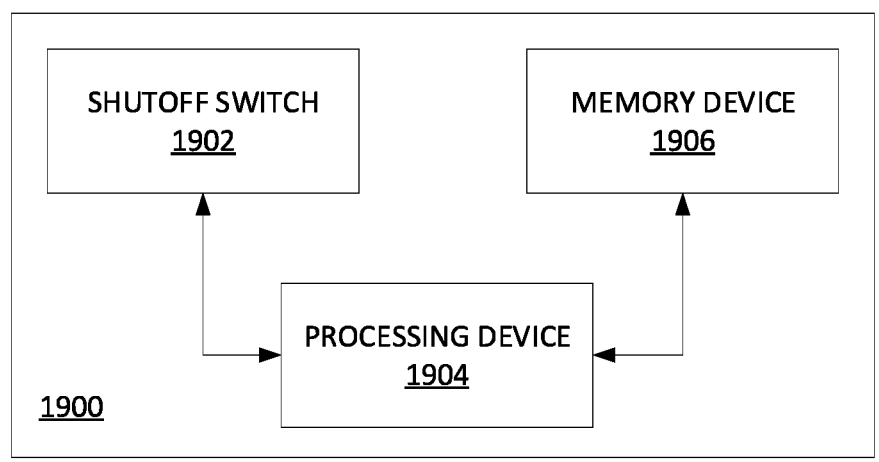
FIG. 19 is a block diagram of a portable user device for facilitating charging of a power source of the portable user device, in accordance with some embodiments.

FIG. 19 is a block diagram of a portable user device 1900 for facilitating charging of a power source of the portable user device 1900, in accordance with some embodiments. Accordingly, the portable user device 1900 may include a memory device 1906, a processing device 1904, and a shutoff switch 1902.

Further, the memory device 1906 may be configured for retrieving at least one power source information corresponding to at least one power source attribute associated with the power source. Further, a power source attribute of the at least one power source attribute may include a power source charge. Further, a power source information of the at least one power source information may include a current charge level corresponding to the power source charge. Further, the memory device 1906 may be configured for retrieving at least one standard power source information based on the identifying.

Further, the processing device 1904 may be communicatively coupled with the memory device 1906. Further, the processing device 1904 may be configured for analyzing the at least one power source information. Further, the processing device 1904 may be configured for identifying the power source based the analyzing. Further, the processing device 1904 may be configured for comparing the at least one power source information and the at least one standard power source information corresponding to the at least one power source attribute of the power source. Further, a standard power source information of the at least one standard source information may include an optimal charge level corresponding to the power source charge. Further, the processing device 1904 may be configured for generating a charging command based on the comparing.

Further, the shutoff switch 1902 may be communicatively coupled with the processing device 1904. Further, the shutoff switch 1902 may be configured to transition between a power-on state and a power-off state based on the control command. Further, the shutoff switch 1902 allows the charging of the power source by an external power supply in the power-on state and the shutoff switch 1902 does not allow the charging of the power source by the external power supply in the power-off state.

Further, in some embodiments, the at least one power source information may include a number of charging cycles and the at least one standard power source information may include a standard number of charging cycles. Further, the current charge level may include an initial charge level corresponding to a first-time event and a final charge level corresponding to a second-time event. Further, the processing device 1904 may be configured for analyzing the initial charge level and the final charge level. Further, the processing device 1904 may be configured for determining a charging cycle percentage of a charging cycle based on the analyzing of the initial charge level and the final charge level. Further, the processing device 1904 may be configured for incrementing the number of charging cycles based on the determining. Further, the processing device 1904 may be configured for comparing the number of charging cycles and the standard number of charging cycles. Further, the processing device 1904 may be configured for generating a charging cycle notification based on the comparing of the number of charging cycles and the standard number of charging cycles. Further, the memory device 1906 may be configured for storing the charging cycle notification.

Further, in some embodiments, the at least one standard power source information may include an optimal charge range corresponding to the power source charge. Further, the optimal charge range may include a lower charge level and an upper charge level. Further, the lower charge level may be a first charge percentage of the power source charge. Further, the upper charge level may be a second charge percentage of the power source charge. Further, the first charge percentage may be smaller than the second charge percentage.

Further, in an embodiment, the processing device 1904 may be configured for analyzing the lower charge level and the current charge level. Further, the processing device 1904 may be configured for generating the charging command based on the analyzing of the lower charge level and the current charge level. Further, the shutoff switch 1902 may be configured to transition from the power-off state to the power-on state based on the control command.

Further, in an embodiment, the processing device 1904 may be configured for analyzing the upper charge level and the current charge level. Further, the processing device 1904 may be configured for generating the charging command based on the analyzing of the upper charge level and the current charge level. Further, the shutoff switch 1902 may be configured to transition from the power-on state to the power-off state based on the control command.

Further, in an embodiment, the processing device 1904 may be configured for comparing the lower charge level and the current charge level. Further, the processing device 1904 may be configured for comparing the upper charge level and the current charge level. Further, the processing device 1904 may be configured for analyzing at least one first status information and at least one second status information using at least one artificial intelligence model. Further, the processing device 1904 may be configured for determining the first charge percentage corresponding to the power source charge for the lower level charge and the second charge percentage corresponding to the power source charge for the upper charge level based on the analyzing of the at least one first status information and the at least one second status information. Further, the processing device 1904 may be configured for generating the optimal charge range of the at least one standard power source information based on the determining. Further, the memory device 1906 may be configured for retrieving the at least one first status information associated with the power source based on the comparing of the lower charge level and the current charge level. Further, the memory device 1906 may be configured for retrieving the at least one second status information associated with the power source based on the comparing of the upper charge level and the current charge level. Further, the memory device 1906 may be configured for storing the optimal charge range. Further, in an embodiment, the processing device 1904 may be configured for generating power source data associated with the power source based on the analyzing of the at least one first status information and the at least one second status information. Further, the memory device 1906 may be configured for storing the power source data.

Further, in an embodiment, the memory device 1906 may be configured for retrieving the first charge percentage corresponding to the power source charge for the lower charge level. Further, the memory device 1906 may be configured for retrieving the second charge percentage corresponding to the power source charge for the upper charge level. Further, the memory device 1906 may be configured for storing the optimal charge range. Further, the processing device 1904 may be configured for analyzing the first charge percentage and the second charge percentage. Further, the processing device 1904 may be configured for generating the optimal charge range of the at least one standard power source information based on the analyzing of the first charge percentage and the second charge percentage.

In further embodiments, a display device may be communicatively coupled with the memory device 1906. Further, the display device may be configured for presenting the at least one power source information and the at least one standard power source information.

Figure 20:
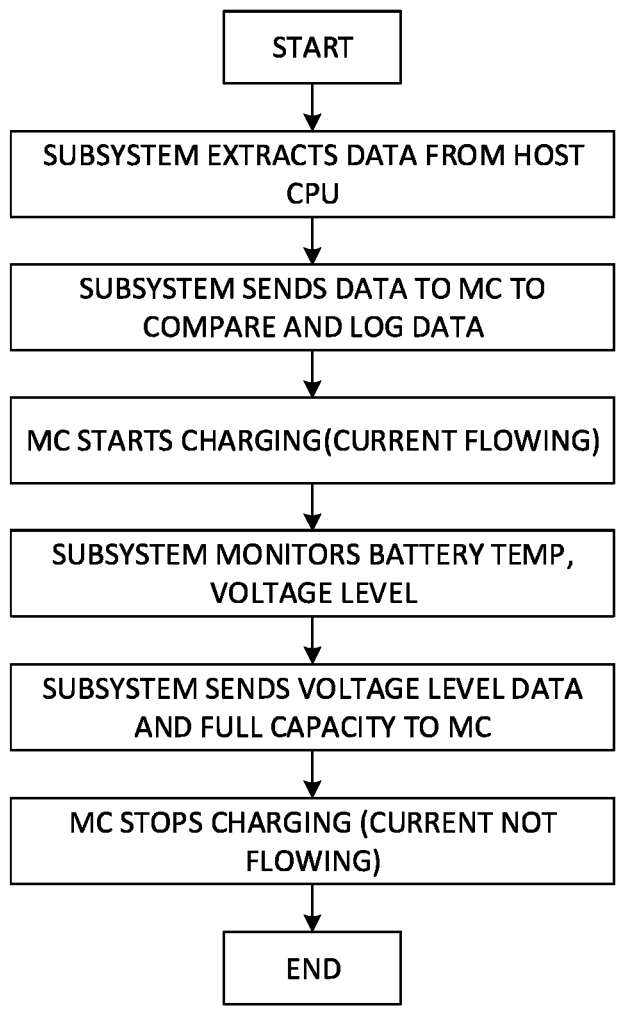
FIG. 20 is a flow diagram of a power regulating cycle for charging portable power sources, in accordance with some embodiments.

FIG. 20 is a flow diagram of a power regulating cycle for charging portable power sources, in accordance with some embodiments. Further, the power regulating cycle may include a step of initiating (start). Further, the power regulating cycle may include a step of extracting data from host CPU using a subsystem. Further, the power regulating cycle may include a step of sending the data to a microcontroller (MC) using the subsystem for comparing and logging. Further, the power regulating cycle may include a step of initiating charging by the microcontroller. Further, the power regulating cycle may include a step of monitoring battery temperature, voltage level, etc using the subsystem. Further, the power regulating cycle may include a step of sending the voltage level and full capacity to the microcontroller using the subsystem. Further, the power regulating cycle may include a step of terminating (stop) of charging by the microcontroller. Further, the power regulating cycle may include a step of terminating (end).

Figure 21:
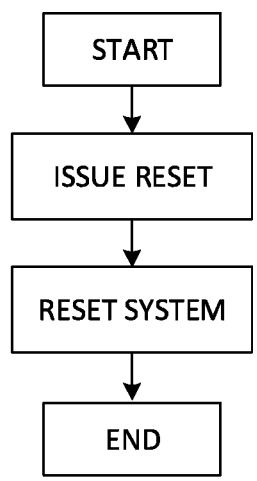
FIG. 21 is a flow diagram of a bug detection cycle for managing a bug during charging of portable power sources, in accordance with some embodiments.

FIG. 21 is a flow diagram of a bug detection cycle for managing a bug during charging of portable power sources, in accordance with some embodiments. Further, the bug detection cycle may include a step of initiating (start). Further, the bug detection cycle may include a step of resetting issue. Further, the bug detection cycle may include a step of resetting system. Further, the bug detection cycle may include a step of terminating (end).

Figure 22:
FIG. 22 is a block diagram of a connection between a software and a hardware of a charging system, in accordance with some embodiments.

FIG. 22 is a block diagram of connection between a software and a hardware for a charging system, in accordance with some embodiments.

Figure 23:
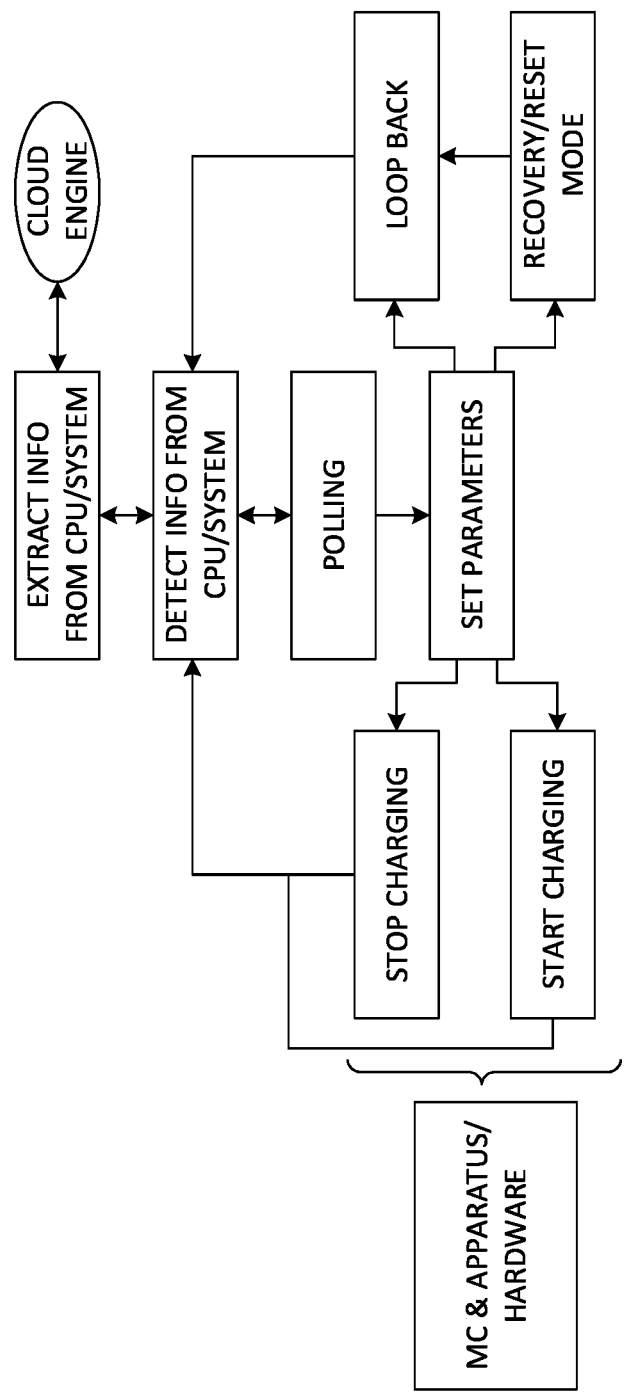
FIG. 23 is a flow diagram of a method for facilitating charging of portable power sources, in accordance with some embodiments.

FIG. 23 is a flow diagram of a method for facilitating charging of portable power sources, in accordance with some embodiments.

Figure 24:
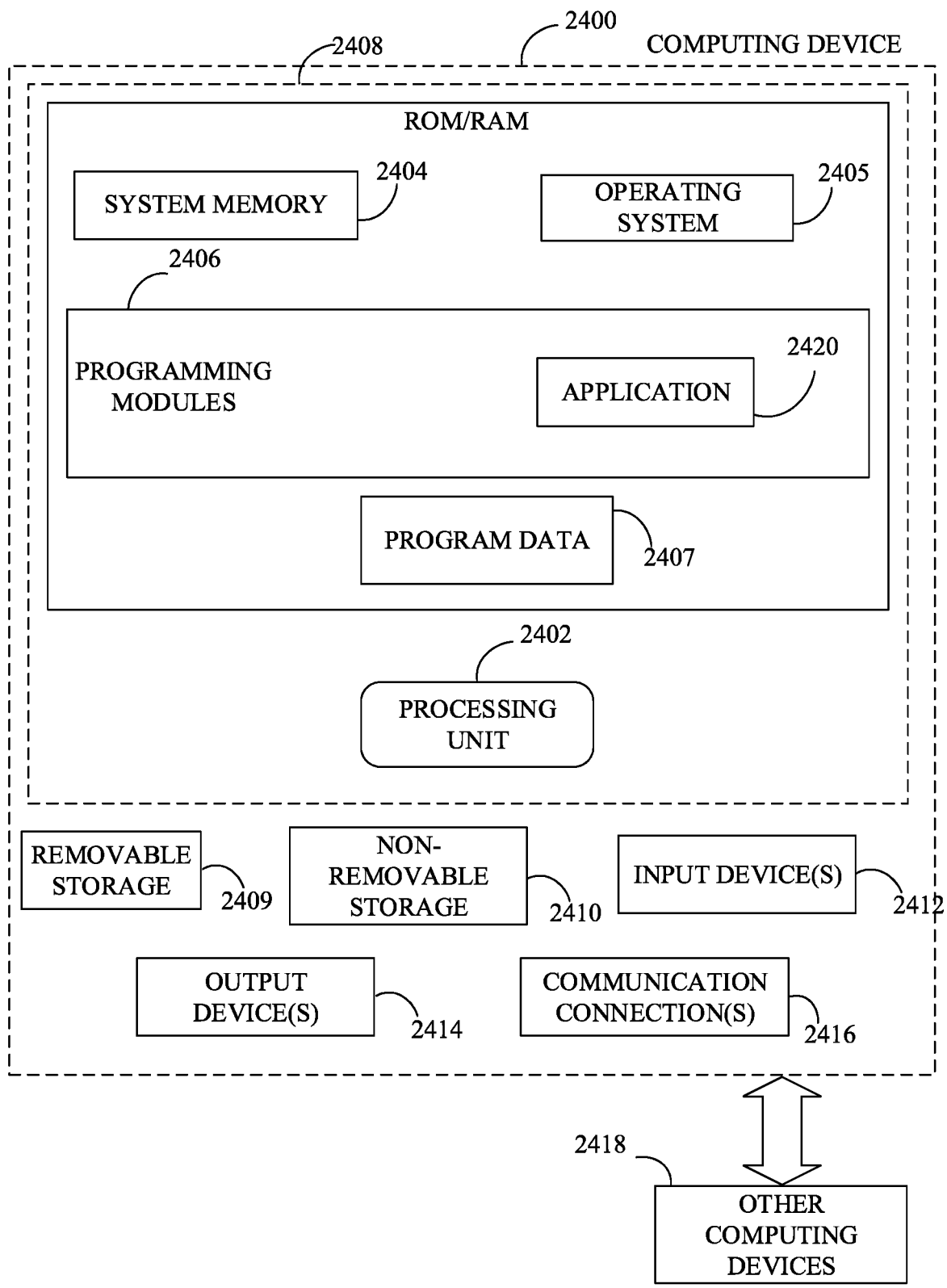
FIG. 24 is a block diagram of a computing device for implementing the methods disclosed herein, in accordance with some embodiments.

With reference to FIG. 24, a system consistent with an embodiment of the disclosure may include a computing device or cloud service, such as computing device 2400. In a basic configuration, computing device 2400 may include at least one processing unit 2402 and a system memory 2404. Depending on the configuration and type of computing device, system memory 2404 may comprise, but is not limited to, volatile (e.g. random-access memory (RAM)), non-volatile (e.g. read-only memory (ROM)), flash memory, or any combination. System memory 2404 may include operating system 2405, one or more programming modules 2406, and may include a program data 2407. Operating system 2405, for example, may be suitable for controlling computing device 2400's operation. In one embodiment, programming modules 2406 may include the image-processing module and machine learning module. Furthermore, embodiments of the disclosure may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410. Computer storage media may include volatile and non-volatile, removable and non-removable media implemented in any method or technology for storage of information, such as computer-readable instructions, data structures, program modules, or other data. System memory 2404, removable storage 2409, and non-removable storage 2410 are all computer storage media examples (for example, memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of device 2400. Computing device 2400 may also have input device(s) 2412 such as a keyboard, a mouse, a pen, a sound input device, a touch input device, a location sensor, a camera, a biometric sensor, etc. Output device(s) 2414 such as a display, speakers, a printer, etc. may also be included. The aforementioned devices are examples and others may be used.

Computing device 2400 may also contain a communication connection 2416 that may allow device 2400 to communicate with other computing devices 2418, such as over a network in a distributed computing environment, for example, an intranet or the Internet. Communication connection 2416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 2404, including operating system 2405. While executing on processing unit 2402, programming modules 2406 (e.g., application 2420 such as a media player) may perform processes including, for example, one or more stages of methods, algorithms, systems, applications, servers, databases as described above. The aforementioned process is an example, and processing unit 2402 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating charging of portable power sources using a charging system, the method comprising:
    receiving, using a communication interface, at least one power source information corresponding to at least one power source attribute associated with a plurality of portable power sources from a user device, wherein a power source attribute of the at least one power source attribute comprises a power source charge, wherein a power source information of the at least one power source information comprises a current charge level corresponding to the power source charge;
    analyzing, using a processing device, the at least one power source information;
    identifying, using the processing device, a portable power source of the plurality of portable power sources based the analyzing;
    retrieving, using a memory device, at least one standard power source information corresponding to the at least one power source attribute of the portable power source based on the identifying, wherein a standard power source information of the at least one standard source information comprises an optimal charge level corresponding to the power source charge;
    comparing, using the processing device, the at least one power source information and the at least one standard power source information; and
    generating, using the processing device, a charging command based on the comparing, wherein the charging command incorporation with a shutoff switch of the charging system is configured for charging the portable power source.

2. The method of claim 1, wherein the at least one power source information comprises a number of charging cycles and the at least one standard power source information comprises a standard number of charging cycles, wherein the current charge level comprises an initial charge level corresponding to a first-time event and a final charge level corresponding to a second-time event, wherein the method further comprises:
    analyzing, using the processing device, the initial charge level and the final charge level;
    determining, using the processing device, a charging cycle percentage of a charging cycle based on the analyzing of the initial charge level and the final charge level based on the analyzing of the initial charge level and the final charge level;
    incrementing, using the processing device, the number of charging cycles based on the determining;
    comparing, using the processing device, the number of charging cycles and the standard number of charging cycles;
    generating, using the processing device, a charging cycle notification based on the comparing of the number of charging cycles and the standard number of charging cycles; and
    transmitting, using the communication interface, the charging cycle notification the user device.

3. The method of claim 1, wherein the at least one standard power source information comprises an optimal charge range corresponding to the power source charge, wherein the optimal charge range comprises a lower charge level and an upper charge level, wherein the lower charge level corresponds to a first charge percentage of the power source charge, wherein the upper charge level corresponds to a second charge percentage of the power source charge, wherein the first charge percentage is smaller than the second charge percentage.

4. The method of claim 3 further comprising:
analyzing, using the processing device, the lower charge level and the current charge level; and
generating, using the processing device, the charging command based on the analyzing of the lower charge level and the current charge level, wherein the charging command incorporation with the shutoff switch of the charging system configured for initiating charging the portable power source.

5. The method of claim 3 further comprising:
analyzing, using the processing device, the upper charge level and the current charge level; and
generating, using the processing device, the charging command based on the analyzing of the upper charge level and the current charge level, wherein the charging command incorporation with the shutoff switch of the charging system configured for terminating charging the portable power source.

6. The method of claim 3 further comprising:
comparing, using the processing device, the lower charge level and the current charge level;
receiving, using the communication interface, at least one first status information associated with the portable power source from the user device based on the comparing of the lower charge level and the current charge level;
comparing, using the processing device, the upper charge level and the current charge level;
receiving, using the communication interface, at least one second status information associated with the portable power source from the user device based on the comparing of the upper charge level and the current charge level;
analyzing, using the processing device, the at least one first status information and the at least one second status information using at least one artificial intelligence model;
determining, using the processing device, the first charge percentage corresponding to the power source charge for the lower level charge and the second charge percentage corresponding to the power source charge for the upper charge level;
generating, using the processing device, the optimal charge range of the at least one standard power source information based on the determining; and
storing, using the memory device, the optimal charge range.

7. The method of claim 3 further comprising:
receiving, using the communication interface, the first charge percentage corresponding to the power source charge for the lower charge level from the user device;
receiving, using the communication interface, the second charge percentage corresponding to the power source charge for the upper charge level from the user device;
analyzing, using the processing device, the first charge percentage and the second charge percentage;
generating, using the processing device, the optimal charge range of the at least one standard power source information based on the analyzing of the first charge percentage and the second charge percentage; and
storing, using the memory device, the optimal charge range.

8. The method of claim 6 further comprising:
generating, using the processing device, power source data associated with the portable power source based on the analyzing of the at least one first status information and the at least one second status information; and
transmitting, using the communication interface, the power source data to the user device.

9. The method of claim 1 further comprising transmitting, using the communication interface, the at least one power source information and the at least one standard power source information to a display device, wherein the display device is configured for presenting the at least one power source information and the at least one standard power source information.

10. The method of claim 1 further comprising receiving, using the communication interface, the charging command associated with the portable power source from the user device, wherein the charging command incorporation with the shutoff switch of the charging system is configured for the charging of the portable power source.

11. A charging system for facilitating charging of portable power sources, the charging system comprising:
a communication interface configured for receiving at least one power source information corresponding to at least one power source attribute associated with a plurality of portable power sources from a user device, wherein a power source attribute of the at least one power source attribute comprises a power source charge, wherein a power source information of the at least one power source information comprises a current charge level corresponding to the power source charge;
a processing device communicatively coupled with the communication interface, wherein the processing device is configured for:
analyzing the at least one power source information;
identifying a portable power source of the plurality of portable power sources based the analyzing; and
comparing the at least one power source information and at least one standard power source information corresponding to the at least one power source attribute of the portable power source, wherein a standard power source information of the at least one standard source information comprises an optimal charge level corresponding to the power source charge; and
generating a charging command based on the comparing, wherein the charging command incorporation with a shutoff switch of the charging system is configured for charging the portable power source; and
a memory device communicatively coupled with the processing device,
wherein the memory device is configured for retrieving the at least one standard power source information based on the identifying.

12. The charging system of claim 11, wherein the at least one power source information comprises a number of charging cycles and the at least one standard power source information comprises a standard number of charging cycles, wherein the current charge level comprises an initial charge level corresponding to a first-time event and a final charge level corresponding to a second-time event, wherein the processing device is further configured for:

analyzing the initial charge level and the final charge level;

determining a charging cycle percentage of a charging cycle based on the analyzing of the initial charge level and the final charge level;

incrementing the number of charging cycles based on the determining;

comparing the number of charging cycles and the standard number of charging cycles; and generating a charging cycle notification based on the comparing of the number of charging cycles and the standard number of charging cycles, wherein the communication interface is configured for transmitting the charging cycle notification the user device.

13. The charging system of claim 11, wherein the at least one standard power source information comprises an optimal charge range corresponding to the power source charge, wherein the optimal charge range comprises a lower charge level and an upper charge level, wherein the lower charge level is a first charge percentage of the power source charge, wherein the upper charge level is a second charge percentage of the power source charge, wherein the first charge percentage is smaller than the second charge percentage.

14. The charging system of claim 13, wherein the processing device is further configured for:

analyzing the lower charge level and the current charge level; and generating the charging command based on the analyzing of the lower charge level and the current charge level, wherein the charging command incorporation with the shutoff switch of the charging system configured for initiating charging the portable power source.

15. The charging system of claim 13, wherein the processing device is further configured for:

analyzing the upper charge level and the current charge level; and generating the charging command based on the analyzing of the upper charge level and the current charge level, wherein the charging command incorporation with the shutoff switch of the charging system configured for terminating charging the portable power source.

16. The charging system of claim 13, wherein the processing device is further configured for:

comparing the lower charge level and the current charge level;

comparing the upper charge level and the current charge level;

analyzing at least one first status information and at least one second status information using at least one artificial intelligence model;

determining the first charge percentage corresponding to the power source charge for the lower level charge and the second charge percentage corresponding to the power source charge for the upper charge level based on the analyzing of the at least one first status information and the at least one second status information; and generating the optimal charge range of the at least one standard power source information based on the determining, wherein the communication interface is configured for:

receiving the at least one first status information associated with the portable power source from the user device based on the comparing of the lower charge level and the current charge level; and receiving the at least one second status information associated with the portable power source from the user device based on the comparing of the upper charge level and the current charge level, wherein the memory device is configured for storing the optimal charge range.

17. The charging system of claim 13, wherein the communication interface is further configured for:

receiving the first charge percentage corresponding to the power source charge for the lower charge level from the user device; and receiving the second charge percentage corresponding to the power source charge for the upper charge level from the user device, wherein the processing device is configured for:

analyzing the first charge percentage and the second charge percentage; and generating the optimal charge range of the at least one standard power source information based on the analyzing of the first charge percentage and the second charge percentage, wherein the memory device is configured for storing the optimal charge range.

18. The charging system of claim 16, wherein the processing device is configured for generating power source data associated with the portable power source based on the analyzing of the at least one first status information and the at least one second status information, wherein the communication interface is configured for transmitting the power source data to the user device.

19. The charging system of claim 11, wherein the communication interface is configured for transmitting the at least one power source information and the at least one standard power source information to a display device, wherein the display device is configured for presenting the at least one power source information and the at least one standard power source information.

20. A charging system for facilitating charging of portable power sources, the charging system comprising:

an electrical input terminal;
an output terminal;
a shutoff switch;
a microcontroller;
a wireless communication module;
a rectifier;
a voltage regulator;
a semiconductor substrate;
an external power supply;
a portable power source;
the rectifier, the voltage regulator and the shutoff switch being electrically integrated in between the electrical input terminal and the output terminal;
the electrical input terminal being electrically connected to the portable power source sequentially through the rectifier, the voltage regulator, the shutoff switch and the output terminal;
the microcontroller being electronically connected to the shutoff switch;
the wireless communication module is electronically connected to the microcontroller;
the electrical input terminal being externally mounted onto the semiconductor substrate;
the output terminal being externally mounted onto the semiconductor substrate;

the output terminal being positioned offset from the electrical input terminal across the semiconductor substrate;

the electrical input terminal, the rectifier, the voltage regulator, the shutoff switch, the output terminal, the microcontroller, and the wireless communication module being operatively coupled to the semiconductor substrate via electrical connections between the electrical input terminal, the rectifier, the voltage regulator, the shutoff switch, the output terminal, the microcontroller and the wireless communication module established by the semiconductor substrate;

the output terminal being operatively coupled to the portable power source; and the electrical input terminal being operatively coupled to the external power supply;

wherein the wireless communication module is configured for receiving at least one power source information associated with a plurality of portable power sources from a user device;

a memory device configured for storing:
 the at least one power source information; and
 at least one standard power source information associated with a plurality portable power sources comprised in the user device;

wherein the microcontroller is configured for:
 analyzing the at least one power source information;
 identifying a portable power source of the plurality of power sources based on the analyzing;
 retrieving the at least one standard power source information based on the identifying;
 comparing the at least one power source information and the at least one standard power source information; and
 controlling the shutoff switch based on the comparing.

21. A portable user device for facilitating charging of a power source of the portable user device, the portable user device comprising:
 a memory device configured for:
  retrieving at least one power source information corresponding to at least one power source attribute associated with the power source, wherein a power source attribute of the at least one power source attribute comprises a power source charge, wherein a power source information of the at least one power source information comprises a current charge level corresponding to the power source charge; and
  retrieving at least one standard power source information based on the identifying;
 a processing device communicatively coupled with the memory device, wherein the processing device is configured for:
  analyzing the at least one power source information;
  identifying the power source based the analyzing;
  comparing the at least one power source information and the at least one standard power source information corresponding to the at least one power source attribute of the power source, wherein a standard power source information of the at least one standard source information comprises an optimal charge level corresponding to the power source charge; and
  generating a charging command based on the comparing; and
 a shutoff switch communicatively coupled with the processing device, wherein the shutoff switch is configured to transition between a power-on state and a power-off state based on the control command, wherein the shutoff switch allows the charging of the power source by an external power supply in the power-on state and the shutoff switch does not allow the charging of the power source by the external power supply in the power-off state.

22. The portable user device of claim 21, wherein the at least one power source information comprises a number of charging cycles and the at least one standard power source information comprises a standard number of charging cycles, wherein the current charge level comprises an initial charge level corresponding to a first-time event and a final charge level corresponding to a second-time event, wherein the processing device is further configured for:
 analyzing the initial charge level and the final charge level;
 determining a charging cycle percentage of a charging cycle based on the analyzing of the initial charge level and the final charge level;
 incrementing the number of charging cycles based on the determining;
 comparing the number of charging cycles and the standard number of charging cycles; and
 generating a charging cycle notification based on the comparing of the number of charging cycles and the standard number of charging cycles, wherein the memory device is configured for storing the charging cycle notification.

23. The portable user device of claim 21, wherein the at least one standard power source information comprises an optimal charge range corresponding to the power source charge, wherein the optimal charge range comprises a lower charge level and an upper charge level, wherein the lower charge level is a first charge percentage of the power source charge, wherein the upper charge level is a second charge percentage of the power source charge, wherein the first charge percentage is smaller than the second charge percentage.

24. The portable user device of claim 23, wherein the processing device is further configured for:
 analyzing the lower charge level and the current charge level; and
 generating the charging command based on the analyzing of the lower charge level and the current charge level, wherein the shutoff switch is configured to transition from the power-off state to the power-on state based on the control command.

25. The portable user device of claim 23, wherein the processing device is further configured for:
 analyzing the upper charge level and the current charge level; and
 generating the charging command based on the analyzing of the upper charge level and the current charge level, wherein the shutoff switch is configured to transition from the power-on state to the power-off state based on the control command.

26. The portable user device of claim 23, wherein the processing device is further configured for:
 comparing the lower charge level and the current charge level;
 comparing the upper charge level and the current charge level;
 analyzing at least one first status information and at least one second status information using at least one artificial intelligence model;
 determining the first charge percentage corresponding to the power source charge for the lower level charge and the second charge percentage corresponding to the power source charge for the upper charge level based on the analyzing of the at least one first status information and the at least one second status information; and generating the optimal charge range of the at least one standard power source information based on the determining, wherein the memory device is configured for:

retrieving the at least one first status information associated with the power source based on the comparing of the lower charge level and the current charge level;

retrieving the at least one second status information associated with the power source based on the comparing of the upper charge level and the current charge level; and storing the optimal charge range.

27. The portable user device of claim 23, wherein the memory device is further configured for:

retrieving the first charge percentage corresponding to the power source charge for the lower charge level;

retrieving the second charge percentage corresponding to the power source charge for the upper charge level; and storing the optimal charge range, wherein the processing device is configured for:

analyzing the first charge percentage and the second charge percentage; and generating the optimal charge range of the at least one standard power source information based on the analyzing of the first charge percentage and the second charge percentage.

28. The portable user device of claim 26, wherein the processing device is configured for generating power source data associated with the power source based on the analyzing of the at least one first status information and the at least one second status information, wherein the memory device is configured for storing the power source data.

29. The portable user device of claim 21 further comprising a display device communicatively coupled with the memory device, wherein the display device is configured for presenting the at least one power source information and the at least one standard power source information.

* * * * *